(12) United States Patent
Yang et al.

(10) Patent No.: US 10,609,690 B2
(45) Date of Patent: Mar. 31, 2020

(54) TERMINAL DEVICE, NETWORK DEVICE, UPLINK SENDING METHOD, AND UPLINK RECEIVING METHOD

(71) Applicant: HUAWEI TECHNOLOGIES CO., LTD., Shenzhen, Guangdong (CN)

(72) Inventors: Xiaodong Yang, Shenzhen (CN); Jian Zhang, Beijing (CN); Yongxia Lyu, Ottawa (CA); Wei Quan, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 13 days.

(21) Appl. No.: 15/933,589

(22) Filed: Mar. 23, 2018

(65) Prior Publication Data
US 2018/0213526 A1 Jul. 26, 2018

Related U.S. Application Data

(63) Continuation of application No. PCT/CN2015/090415, filed on Sep. 23, 2015.

(51) Int. Cl.
*H04W 72/04* (2009.01)
*H04L 5/00* (2006.01)
(Continued)

(52) U.S. Cl.
CPC ......... *H04W 72/0413* (2013.01); *H04L 5/001* (2013.01); *H04L 5/0007* (2013.01);
(Continued)

(58) Field of Classification Search
CPC ... H04W 72/04; H04W 72/0413; H04W 4/00; H04L 5/00; H04L 5/0007; H04L 5/001;
(Continued)

(56) References Cited

U.S. PATENT DOCUMENTS 8,687,484 B2 * 4/2014 Kim ...................... H04L 5/0053
370/229
9,060,376 B2 * 6/2015 Noh ...................... H04W 72/12
(Continued)

FOREIGN PATENT DOCUMENTS

CN 101568165 A 10/2009
CN 101771463 A 7/2010
(Continued)

OTHER PUBLICATIONS

Extended European Search Report issued in European Application No. 15904374.4 dated Aug. 16, 2018, 9 pages.
(Continued)

*Primary Examiner* — Tri H Phan
(74) *Attorney, Agent, or Firm* — Fish & Richardson P.C.

(57) ABSTRACT

The present disclosure relates to a terminal device, in which a processing module selects one or more normal carriers or special carriers from a first carrier set for an uplink subframe, where the first carrier set includes all carriers in carrier aggregation that are used by the terminal device to send a first uplink subframe; and a sending module cancels sending of the uplink subframe on one or more carriers, where the special carrier is a carrier on which the terminal device sends neither uplink data nor uplink control information in uplink, and the normal carrier is a carrier that is used by the terminal device to send uplink data and/or uplink control information. An uplink subframe on some carriers is rejected, thereby resolving a problem that information such as a downlink channel characteristic of a carrier cannot be obtained when no uplink reference signal is sent on the carrier.

19 Claims, 10 Drawing Sheets

```
                                                    ┌─ S1601
    ┌─────────────────────────────────────────────────┐
    │ A network device determines that a terminal device cancels sending of K │
    │ consecutive orthogonal frequency division multiplexing OFDM symbols of a │
    │ second uplink subframe, and determines that the terminal device sends a first │
    │ uplink signal in the K symbols on one or more special carriers in a second carrier │
    │                          set                           │
    └─────────────────────────────────────────────────┘
                              │
                              ▼                     ┌─ S1602
    ┌─────────────────────────────────────────────────┐
    │ The network device cancels receiving of the K OFDM symbols, and receives a │
    │ second uplink signal in the K symbols on the one or more special carriers in the │
    │                    second carrier set                  │
    └─────────────────────────────────────────────────┘
```

(51) Int. Cl.
*H04L 5/14* (2006.01)
*H04L 25/02* (2006.01)

(52) U.S. Cl.
CPC ........... *H04L 5/1469* (2013.01); *H04W 72/04* (2013.01); *H04L 5/0048* (2013.01); *H04L 25/0226* (2013.01)

(58) Field of Classification Search
CPC ....... H04L 5/0048; H04L 5/14; H04L 5/1469; H04L 25/02; H04L 25/0226; H04L 1/1812; H04L 5/0055; H04L 5/0094; H04L 25/0202; H04L 25/0204; H04L 25/0224; H04L 25/0228; H04L 25/023; H04L 25/0232; H04L 25/0234; H04L 25/0236
See application file for complete search history.

(56) References Cited

U.S. PATENT DOCUMENTS

| | | | | |
|---|---|---|---|---|
| 9,215,678 | B2* | 12/2015 | Dinan | H04W 56/0045 |
| 9,258,092 | B2* | 2/2016 | Heo | H04L 5/001 |
| 9,591,584 | B2* | 3/2017 | Seo | H04W 52/146 |
| 10,110,362 | B2* | 10/2018 | Dinan | H04L 1/1812 |
| 10,200,181 | B2* | 2/2019 | Dinan | H04L 1/1812 |
| 10,291,379 | B2* | 5/2019 | Kadous | H04L 1/1635 |
| 2010/0085956 | A1 | 4/2010 | Ahn et al. | |
| 2010/0234003 | A1 | 9/2010 | Theppasandra et al. | |
| 2011/0044181 | A1 | 2/2011 | Suo et al. | |
| 2013/0010659 | A1 | 1/2013 | Chen et al. | |
| 2013/0215885 | A1 | 8/2013 | Vijayasankar et al. | |
| 2013/0258958 | A1 | 10/2013 | Dinan | |
| 2015/0195829 | A1 | 7/2015 | Uchino et al. | |
| 2015/0245347 | A1 | 8/2015 | Yi et al. | |
| 2016/0373225 | A1 | 12/2016 | Kim et al. | |

FOREIGN PATENT DOCUMENTS

| | | |
|---|---|---|
| CN | 102084710 A | 6/2011 |
| CN | 103391628 A | 11/2013 |
| CN | 103814544 A | 5/2014 |
| CN | 104796991 A | 7/2015 |
| JP | 2014023055 A | 2/2014 |
| JP | 2014525711 A | 9/2014 |
| WO | 2015053590 A1 | 4/2015 |

OTHER PUBLICATIONS

3GPP TS 36.331 V12.6.0 (Jun. 2015);3rd Generation Partnership Project;Technical Specification Group Radio Access Network;Evolved Universal Terrestrial Radio Access (E-UTRA);Radio Resource Control (RRC);Protocol specification (Release 12),total 449 pages.
3GPP TS 36.321 V12.6.0 (Jun. 2015);3rd Generation Partnership Project;Technical Specification Group Radio Access Network;Evolved Universal Terrestrial Radio Access (E-UTRA);Medium Access Control (MAC) protocol specification (Release 12),total 77 pages.
3GPP TS 36.213 V12.6.0 (Jun. 2015);3rd Generation Partnership Project;Technical Specification Group Radio Access Network;Evolved Universal Terrestrial Radio Access (E-UTRA);Physical layer procedures(Release 12),total 241 pages.
International Search Report issued in International Application No. PCT/CN2015/090415 dated Jun. 15, 2016, 13 pages.
Japanese Office Action issued in Japanese Application No. 2018-515219 dated Feb. 26, 2019, 6 pages.
Chinese Office Action issued in Chinese Application No. 201580065483.6 dated Apr. 4, 2019, 38 pages.

* cited by examiner

TERMINAL DEVICE, NETWORK DEVICE, UPLINK SENDING METHOD, AND UPLINK RECEIVING METHOD

CROSS-REFERENCE TO RELATED APPLICATIONS

This disclosure is a continuation of International Application No. PCT/CN2015/090415, filed on Sep. 23, 2015, the disclosure of which is hereby incorporated by reference in its entirety.

TECHNICAL FIELD

The present disclosure relates to wireless communications technologies, and in particular, to a terminal device, a network device, an uplink sending method, and an uplink receiving method.

BACKGROUND

In an evolution process of a Long Term Evolution (LTE) protocol, a carrier aggregation (CA) technology is introduced in Release (R) 10. In the technology, user equipment (UE) is allowed to simultaneously send or receive data on a plurality of carriers. A network device such as an evolved NodeB (eNB) selects a cell as a primary cell (Pcell) of the UE, and uses a cell on another carrier as a secondary cell (Scell) of the UE. The UE may send or receive data on a plurality of aggregated cells. Herein, an LTE system that supports CA is referred to as an LTE CA system.

Referring to FIG. 1, in the LTE CA system, each UE is corresponding to one Pcell that is a cell 1 in FIG. 1 and one or more Scells that include a cell 2 and a cell 3 in FIG. 1. Both the primary cell and the secondary cell may be used to provide a transmission resource used for uplink and/or downlink data transmission between the network device and the UE. The UE receives paging in the Pcell, and may perform a contention-based random access process in the Pcell.

At present, in a typical case, the UE in the LTE CA system supports aggregation of a maximum of five downlink carriers and aggregation of a maximum of two uplink carriers. That is, carrier aggregation of five downlink carriers and carrier aggregation of one uplink carrier are allowed, and carrier aggregation of five downlink carriers and carrier aggregation of two uplink carriers are also allowed.

FIG. 2 is a schematic diagram in which UE supports carrier aggregation of two uplink carriers and carrier aggregation of five downlink carriers in a time division duplex (TDD) LTE system. Because the UE supports two uplink carriers, the UE can send a sounding reference signal (SRS) only in an uplink subframe on the two carriers on which the UE simultaneously works. The TDD LTE system uses a time division duplex mode, and an uplink channel and a downlink channel that work on a same carrier have similar channel characteristics and are reciprocal. Therefore, if the SRS is sent only in the uplink subframe on the two carriers, only channel characteristics of downlink channels of the two carriers can be obtained, and downlink channel characteristics of remaining three carriers cannot be obtained from the SRS that is sent in the uplink subframe.

SUMMARY

In view of this, a terminal device, a network device, an uplink sending method, and an uplink receiving method are provided, to resolve a problem in a carrier aggregation scenario that information such as downlink channel characteristics of some carriers cannot be obtained when no uplink reference signal (such as an SRS) is sent on these carriers.

According to a first aspect, an embodiment of the present disclosure provides a terminal device in a carrier aggregation system, including a processing module and a sending module, where the processing module is configured to select one or more carriers from a first carrier set for a first uplink subframe, where the first carrier set includes all carriers in carrier aggregation that are used by the terminal device to send the first uplink subframe; and the sending module is configured to cancel sending of the first uplink subframe on the one or more carriers selected by the processing module, where the one or more carriers selected by the processing module are normal carriers or special carriers; and the special carrier is a carrier on which the terminal device sends neither uplink data nor uplink control information in uplink, and the normal carrier is a carrier that is used by the terminal device to send uplink data and/or uplink control information.

With reference to the first aspect, in a first possible implementation, the processing module is specifically configured to:

when a power sum of the terminal device for sending the first uplink subframe on all the carriers in the first carrier set is greater than a maximum transmit power of the terminal device, select the one or more carriers from the first carrier set; and a power sum of the terminal device for sending the first uplink subframe on carriers other than the selected one or more carriers in the first carrier set is not greater than the maximum transmit power of the terminal device.

With reference to the first aspect, in a second possible implementation, the processing module is specifically configured to:

when a quantity of carriers included in the first carrier set of the terminal device is greater than a quantity of uplink carriers that can be simultaneously sent by the terminal device, select the one or more carriers from the first carrier set; and a quantity of carriers that is obtained by subtracting the one or more carriers from the quantity of carriers included in the first carrier set is not greater than the quantity of uplink carriers that can be simultaneously sent by the terminal device.

With reference to the first aspect, or the first or the second possible implementation of the first aspect, in a third possible implementation, the special carrier is a carrier on which the terminal device sends only an uplink signal in uplink, and the uplink signal includes an uplink reference signal and/or a preamble.

With reference to the third possible implementation of the first aspect, in a fourth possible implementation, the uplink reference signal is a sounding reference signal SRS.

According to a second aspect, an embodiment of the present disclosure provides a network device in a carrier aggregation system, including:

a processing module, configured to determine that a terminal device cancels sending of a first uplink subframe on one or more carriers in a first carrier set, where the first carrier set includes all carriers in carrier aggregation that are used by the terminal device to send the first uplink subframe; and a receiving module, configured to cancel receiving of the first uplink subframe on the one or more carriers, where the one or more carriers are normal carriers or special carriers; and the special carrier is a carrier on which the terminal device sends neither uplink data nor uplink control information in uplink, and the normal carrier is a carrier that is used by the terminal device to send uplink data and/or uplink control information.

With reference to the second aspect, in a first possible implementation, the processing module is specifically configured to:

if determining that a power sum of the terminal device for sending the first uplink subframe on all the carriers in the first carrier set is greater than a maximum transmit power of the terminal device, determine that the terminal device cancels sending of the first uplink subframe on the one or more carriers in the first carrier set.

With reference to the second aspect, in a second possible implementation, the processing module is specifically configured to:

when a quantity of carriers included in the first carrier set is greater than a quantity of uplink carriers that can be simultaneously sent by the terminal device, determine that the terminal device cancels sending of the first uplink subframe on the one or more carriers in the first carrier set.

With reference to the second aspect, or the first or the second possible implementation of the second aspect, in a third possible implementation, the special carrier is a carrier on which the terminal device sends only an uplink signal in uplink, and the uplink signal includes an uplink reference signal and/or a preamble.

With reference to the third possible implementation of the second aspect, in a fourth possible implementation, the uplink reference signal is a sounding reference signal SRS.

According to a third aspect, an embodiment of the present disclosure provides a terminal device in a carrier aggregation system, including:

a processing module, configured to determine that the terminal device cancels sending of K consecutive orthogonal frequency division multiplexing OFDM symbols in a second uplink subframe, where the K OFDM symbols are located on one or more normal carriers in a second carrier set, the second carrier set includes all carriers in carrier aggregation that are used by the terminal device to send the second uplink subframe, and K is a positive integer and is not greater than a quantity of OFDM symbols included in the second uplink subframe; and a sending module, configured to send a first uplink signal in the K symbols on one or more special carriers in the second carrier set, where the special carrier is a carrier on which the terminal device sends neither uplink data nor uplink control information in uplink, and the normal carrier is a carrier that is used by the terminal device to send uplink data and/or uplink control information.

With reference to the third aspect, in a first possible implementation, a length of the K symbols is not less than a sum of first duration and second duration;

the first duration is duration required for sending the first uplink signal; and the second duration is duration in which the terminal device is switched between carriers.

With reference to the first possible implementation of the third aspect, in a second possible implementation, the one or more normal carriers in the second carrier set belong to a first timing advance group TAG 1, and the one or more special carriers in the second carrier set belong to a second timing advance group TAG 2; and the length of the K symbols is not less than a sum of the first duration, the second duration, and the third duration, and the third duration is a length that is agreed on in advance according to a TA difference between the TAG 1 and the TAG 2.

With reference to the third aspect, or the first or the second possible implementation of the third aspect, in a third possible implementation, the K symbols are the last K OFDM symbols in the second uplink subframe.

With reference to any one of the third aspect, or the first to the third possible implementations of the third aspect, in a fourth possible implementation, the sending module is further configured to send a second uplink signal in a third uplink subframe on the one or more special carriers in a third carrier set, where the third carrier set includes all carriers in carrier aggregation that are used by the terminal device to send the third uplink subframe; and the processing module is further configured to determine that the terminal device cancels sending of M consecutive OFDM symbols of an adjacent subframe of the third uplink subframe, where the adjacent subframe is also an uplink subframe, where the M OFDM symbols are located on one or more normal carriers in the third carrier set, and M is a positive integer and is not greater than a quantity of OFDM symbols included in the adjacent subframe.

With reference to the fourth possible implementation of the third aspect, in a fifth possible implementation, a length of the M OFDM symbols is not less than the fourth duration; and the fourth duration is duration in which the terminal device is switched between carriers.

With reference to the fifth possible implementation of the third aspect, in a sixth possible implementation, the one or more normal carriers in the third carrier set belong to a third timing advance group TAG 3, and the one or more special carriers in the third carrier set belong to a fourth timing advance group TAG 4; and the length of the K symbols is not less than a sum of the fourth duration and fifth duration, and the fifth duration is a length that is agreed on in advance according to a TA difference between the TAG 3 and the TAG 4.

With reference to any one of the fourth to the sixth possible implementations of the third aspect, in a seventh possible implementation, if the adjacent subframe is a next subframe of the third uplink subframe, the M symbols are the first M OFDM symbols in the next subframe; and/or if the adjacent subframe is a previous subframe of the third uplink subframe, the M symbols are the last M OFDM symbols in the previous subframe.

With reference to any one of the fourth to the seventh possible implementations of the third aspect, in an eighth possible implementation, the second uplink signal includes an uplink reference signal and/or a preamble.

With reference to any one of the third aspect, or the first to the eighth possible implementations of the third aspect, in a ninth possible implementation, the processing module is specifically configured to:

when a power sum of the terminal device for sending the second uplink subframe on all the carriers in the second carrier set is greater than a maximum transmit power of the terminal device, determine that the terminal device cancels sending of the K OFDM symbols; and a power sum of the terminal device for sending the second uplink subframe on carriers other than the one or more normal carriers on which the K OFDM symbols are located in the second carrier set is not greater than the maximum transmit power of the terminal device.

With reference to any one of the third aspect, or the first to the eighth possible implementations of the third aspect, in a tenth possible implementation, the processing module is specifically configured to:

when a quantity of carriers included in the second carrier set of the terminal device is greater than a quantity of uplink carriers that can be simultaneously sent by the terminal device, determine that the terminal device cancels sending of the K OFDM symbols; and a quantity of carriers that is obtained by subtracting the one or more normal carriers on which the K OFDM symbols are located from the quantity of carriers included in the second carrier set is not greater than the quantity of uplink carriers that can be simultaneously sent by the terminal device.

With reference to any one of the third aspect, or the first to the tenth possible implementations of the third aspect, in an eleventh possible implementation, the first uplink signal includes an uplink reference signal and/or a preamble.

With reference to the eighth or the eleventh possible implementation of the third aspect, in a twelfth possible implementation, the uplink reference signal is a sounding reference signal SRS.

According to a fourth aspect, an embodiment of the present disclosure provides a network device in a carrier aggregation system, including:

a processing module, configured to: determine that a terminal device cancels sending of K consecutive orthogonal frequency division multiplexing OFDM symbols in a second uplink subframe, and determine that the terminal device sends a first uplink signal in the K symbols on one or more special carriers in the second carrier set, where the K OFDM symbols are located on one or more normal carriers in the second carrier set, the second carrier set includes all carriers in carrier aggregation that are used by the terminal device to send the second uplink subframe, and K is a positive integer and is not greater than a quantity of OFDM symbols included in the second uplink subframe; and a receiving module, configured to: cancel receiving of the K OFDM symbols, and receive the second uplink signal in the K symbols on the one or more special carriers in the second carrier set, where the special carrier is a carrier on which the terminal device sends neither uplink data nor uplink control information in uplink, and the normal carrier is a carrier that is used by the terminal device to send uplink data and/or uplink control information.

With reference to the fourth aspect, in a first possible implementation, a length of the K symbols is not less than a sum of first duration and second duration;

the first duration is duration required for sending the first uplink signal; and the second duration is duration in which the terminal device is switched between carriers.

With reference to the first possible implementation of the fourth aspect, in a second possible implementation, the one or more normal carriers in the second carrier set belong to a first timing advance group TAG 1, and the one or more special carriers in the second carrier set belong to a second timing advance group TAG 2; and the length of the K symbols is not less than a sum of the first duration, the second duration, and the third duration, and the third duration is a length that is agreed on in advance according to a TA difference between the TAG 1 and the TAG 2.

With reference to the fourth aspect, or the first or the second possible implementation of the fourth aspect, in a third possible implementation, the K symbols are the last K OFDM symbols in the second uplink subframe.

With reference to any one of the fourth aspect, or the first to the third possible implementations of the fourth aspect, in a fourth possible implementation, the processing module is further configured to: determine that the terminal device sends a second uplink signal in a third uplink subframe on the one or more special carriers in a third carrier set, and determine that the terminal device cancels sending of M consecutive OFDM symbols of an adjacent subframe of the third uplink subframe, where the adjacent subframe is also an uplink subframe, and the third carrier set includes all carriers in carrier aggregation that are used by the terminal device to send the third uplink subframe; and the receiving module is further configured to: receive the second uplink signal on the one or more special carriers in the third carrier set, and cancel receiving of the M consecutive OFDM symbols in the adjacent subframe of the third uplink subframe, where the M OFDM symbols are located on one or more normal carriers in the third carrier set, and M is a positive integer and is not greater than a quantity of OFDM symbols included in the adjacent subframe.

With reference to the fourth possible implementation of the fourth aspect, in a fifth possible implementation, a length of the M OFDM symbols is not less than the fourth duration; and the fourth duration is duration in which the terminal device is switched between carriers.

With reference to the fifth possible implementation of the fourth aspect, in a sixth possible implementation, the one or more normal carriers in the third carrier set belong to a third timing advance group TAG 3, and the one or more special carriers in the third carrier set belong to a fourth timing advance group TAG 4; and the length of the K symbols is not less than a sum of the fourth duration and fifth duration, and the fifth duration is a length that is agreed on in advance according to a TA difference between the TAG 3 and the TAG 4.

With reference to any one of the fourth to the sixth possible implementations of the fourth aspect, in a seventh possible implementation, if the adjacent subframe is a next subframe of the third uplink subframe, the M symbols are the first M OFDM symbols in the next subframe; and/or if the adjacent subframe is a previous subframe of the third uplink subframe, the M symbols are the last M OFDM symbols in the previous subframe.

With reference to any one of the fourth to the seventh possible implementations of the fourth aspect, in an eighth possible implementation, the second uplink signal is an uplink reference signal or a preamble.

With reference to any one of the fourth aspect, or the first to the eighth possible implementations of the fourth aspect, in a ninth possible implementation, the processing module is specifically configured to:

if determining that a power sum of the terminal device for sending the second uplink subframe on all the carriers in the second carrier set is greater than a maximum transmit power of the terminal device, determine that the terminal device cancels sending of the K OFDM symbols.

With reference to any one of the fourth aspect, or the first to the eighth possible implementations of the fourth aspect, in a tenth possible implementation, the processing module is specifically configured to:

when a quantity of carriers included in the second carrier set is greater than a quantity of uplink carriers that can be simultaneously sent by the terminal device, determine that the terminal device cancels sending of the K OFDM symbols.

With reference to any one of the fourth aspect, or the first to the tenth possible implementations of the fourth aspect, in an eleventh possible implementation, the first uplink signal includes an uplink reference signal and/or a preamble.

With reference to the eighth or the eleventh possible implementation of the fourth aspect, in a twelfth possible implementation, the uplink reference signal is a sounding reference signal SRS.

According to a fifth aspect, an embodiment of the present disclosure provides an uplink sending method, applied to a carrier aggregation system and including:

selecting, by a terminal device, one or more carriers from a first carrier set for a first uplink subframe, where the first carrier set includes all carriers in carrier aggregation that are used by the terminal device to send the first uplink subframe; and canceling, by the terminal device, sending of the first uplink subframe on the selected one or more carriers, where the selected one or more carriers are normal carriers or special carriers; and the special carrier is a carrier on which the terminal device sends neither uplink data nor uplink control information in uplink, and the normal carrier is a carrier that is used by the terminal device to send uplink data and/or uplink control information.

With reference to the fifth aspect, in a first possible implementation, the selecting, by a terminal device, one or more carriers from a first carrier set includes:

when a power sum of the terminal device for sending the first uplink subframe on all the carriers in the first carrier set is greater than a maximum transmit power of the terminal device, selecting the one or more carriers from the first carrier set; and a power sum of the terminal device for sending the first uplink subframe on carriers other than the selected one or more carriers in the first carrier set is not greater than the maximum transmit power of the terminal device.

With reference to the fifth aspect, in a second possible implementation, the selecting, by a terminal device, one or more carriers from a first carrier set includes:

when a quantity of carriers included in the first carrier set of the terminal device is greater than a quantity of uplink carriers that can be simultaneously sent by the terminal device, selecting the one or more carriers from the first carrier set; and a quantity of carriers that is obtained by subtracting the one or more carriers from the quantity of carriers included in the first carrier set is not greater than the quantity of uplink carriers that can be simultaneously sent by the terminal device.

With reference to the fifth aspect, or the first or the second possible implementation of the fifth aspect, in a third possible implementation, the special carrier is a carrier on which the terminal device sends only an uplink signal in uplink, and the uplink signal includes an uplink reference signal and/or a preamble.

With reference to the third possible implementation of the fifth aspect, in a fourth possible implementation, the uplink reference signal is a sounding reference signal SRS.

According to a sixth aspect, an embodiment of the present disclosure provides an uplink receiving method, applied to a carrier aggregation system and including:

determining, by a network device, that a terminal device cancels sending of a first uplink subframe on one or more carriers in a first carrier set, where the first carrier set includes all carriers in carrier aggregation that are used by the terminal device to send the first uplink subframe; and canceling, by the network device, receiving of the first uplink subframe on the one or more carriers, where the one or more carriers are normal carriers or special carriers; and the special carrier is a carrier on which the terminal device sends neither uplink data nor uplink control information in uplink, and the normal carrier is a carrier that is used by the terminal device to send uplink data and/or uplink control information.

With reference to the sixth aspect, in a first possible implementation, the determining, by a network device, that a terminal device cancels sending of a first uplink subframe on one or more carriers in a first carrier set includes:

if determining that a power sum of the terminal device for sending the first uplink subframe on all the carriers in the first carrier set is greater than a maximum transmit power of the terminal device, determining, by the network device, that the terminal device cancels sending of the first uplink subframe on the one or more carriers in the first carrier set.

With reference to the sixth aspect, in a second possible implementation, the determining, by a network device, that a terminal device cancels sending of a first uplink subframe on one or more carriers in a first carrier set includes:

when a quantity of carriers included in the first carrier set is greater than a quantity of uplink carriers that can be simultaneously sent by the terminal device, determining, by the network device, that the terminal device cancels sending of the first uplink subframe on the one or more carriers in the first carrier set.

With reference to the sixth aspect, or the first or the second possible implementation of the sixth aspect, in a third possible implementation, the special carrier is a carrier on which the terminal device sends only an uplink signal in uplink, and the uplink signal includes an uplink reference signal and/or a preamble.

With reference to the third possible implementation of the sixth aspect, in a fourth possible implementation, the uplink reference signal is a sounding reference signal SRS.

According to a seventh aspect, an embodiment of the present disclosure provides an uplink sending method, applied to a carrier aggregation system and including:

determining, by a terminal device, to cancel sending of K consecutive orthogonal frequency division multiplexing OFDM symbols in a second uplink subframe, where the K OFDM symbols are located on one or more normal carriers in a second carrier set, the second carrier set includes all carriers in carrier aggregation that are used by the terminal device to send the second uplink subframe, and K is a positive integer and is not greater than a quantity of OFDM symbols included in the second uplink subframe; and sending, by the terminal device, a first uplink signal in the K symbols on one or more special carriers in the second carrier set, where the special carrier is a carrier on which the terminal device sends neither uplink data nor uplink control information in uplink, and the normal carrier is a carrier that is used by the terminal device to send uplink data and/or uplink control information.

With reference to the seventh aspect, in a first possible implementation, a length of the K symbols is not less than a sum of first duration and second duration;

the first duration is duration required for sending the first uplink signal; and the second duration is duration in which the terminal device is switched between carriers.

With reference to the first possible implementation of the seventh aspect, in a second possible implementation, the one or more normal carriers in the second carrier set belong to a first timing advance group TAG 1, and the one or more special carriers in the second carrier set belong to a second timing advance group TAG 2; and the length of the K symbols is not less than a sum of the first duration, the second duration, and the third duration, and the third duration is a length that is agreed on in advance according to a TA difference between the TAG 1 and the TAG 2.

With reference to the seventh aspect, or the first or the second possible implementation of the seventh aspect, in a third possible implementation, the K symbols are the last K OFDM symbols in the second uplink subframe.

With reference to any one of the seventh aspect, or the first to the third possible implementations of the seventh aspect, in a fourth possible implementation, the method further includes:

sending, by the terminal device, a second uplink signal in a third uplink subframe on the one or more special carriers in a third carrier set, where the third carrier set includes all carriers in carrier aggregation that are used by the terminal device to send the third uplink subframe; and determining, by the terminal device, to cancel sending of M consecutive OFDM symbols of an adjacent subframe of the third uplink subframe, where the adjacent subframe is also an uplink subframe, where the M OFDM symbols are located on one or more normal carriers in the third carrier set, and M is a positive integer and is not greater than a quantity of OFDM symbols included in the adjacent subframe.

With reference to the fourth possible implementation of the seventh aspect, in a fifth possible implementation, a length of the M OFDM symbols is not less than the fourth duration; and the fourth duration is duration in which the terminal device is switched between carriers.

With reference to the fifth possible implementation of the seventh aspect, in a sixth possible implementation, the one or more normal carriers in the third carrier set belong to a third timing advance group TAG 3, and the one or more special carriers in the third carrier set belong to a fourth timing advance group TAG 4; and the length of the K symbols is not less than a sum of the fourth duration and fifth duration, and the fifth duration is a length that is agreed on in advance according to a TA difference between the TAG 3 and the TAG 4.

With reference to any one of the fourth to the sixth possible implementations of the seventh aspect, in a seventh possible implementation, if the adjacent subframe is a next subframe of the third uplink subframe, the M symbols are the first M OFDM symbols in the next subframe; and/or if the adjacent subframe is a previous subframe of the third uplink subframe, the M symbols are the last M OFDM symbols in the previous subframe.

With reference to any one of the fourth to the seventh possible implementations of the seventh aspect, in an eighth possible implementation, the second uplink signal includes an uplink reference signal and/or a preamble.

With reference to any one of the seventh aspect, or the first to the eighth possible implementations of the seventh aspect, in a ninth possible implementation, the determining, by a terminal device, to cancel sending of K OFDM symbols in a second uplink subframe includes:

when a power sum of the terminal device for sending the second uplink subframe on all the carriers in the second carrier set is greater than a maximum transmit power of the terminal device, determining to cancel sending of the K OFDM symbols; and a power sum of the terminal device for sending the second uplink subframe on carriers other than the one or more normal carriers on which the K OFDM symbols are located in the second carrier set is not greater than the maximum transmit power of the terminal device.

With reference to any one of the seventh aspect, or the first to the eighth possible implementations of the seventh aspect, in a tenth possible implementation, the determining, by a terminal device, to cancel sending of K OFDM symbols in a second uplink subframe includes:

when a quantity of carriers included in the second carrier set of the terminal device is greater than a quantity of uplink carriers that can be simultaneously sent by the terminal device, canceling sending of the K OFDM symbols; and a quantity of carriers that is obtained by subtracting the one or more normal carriers on which the K OFDM symbols are located from the quantity of carriers included in the second carrier set is not greater than the quantity of uplink carriers that can be simultaneously sent by the terminal device.

With reference to any one of the seventh aspect, or the first to the tenth possible implementations of the seventh aspect, in an eleventh possible implementation, the first uplink signal includes an uplink reference signal and/or a preamble.

With reference to the eighth or the eleventh possible implementation of the seventh aspect, in a twelfth possible implementation, the uplink reference signal is a sounding reference signal SRS.

According to an eighth aspect, an embodiment of the present disclosure provides an uplink receiving method, applied to a carrier aggregation system and including:

determining, by a network device, that a terminal device cancels sending of K consecutive orthogonal frequency division multiplexing OFDM symbols in a second uplink subframe, and determining that the terminal device sends a first uplink signal in the K symbols on one or more special carriers in the second carrier set, where the K OFDM symbols are located on one or more normal carriers in the second carrier set, the second carrier set includes all carriers in carrier aggregation that are used by the terminal device to send the second uplink subframe, and K is a positive integer and is not greater than a quantity of OFDM symbols included in the second uplink subframe; and canceling, by the network device, receiving of the K OFDM symbols, and receiving the second uplink signal in the K symbols on the one or more special carriers in the second carrier set, where the special carrier is a carrier on which the terminal device sends neither uplink data nor uplink control information in uplink, and the normal carrier is a carrier that is used by the terminal device to send uplink data and/or uplink control information.

With reference to the eighth aspect, in a first possible implementation, a length of the K symbols is not less than a sum of first duration and second duration;

the first duration is duration required for sending the first uplink signal; and the second duration is duration in which the terminal device is switched between carriers.

With reference to the first possible implementation of the eighth aspect, in a second possible implementation, the one or more normal carriers in the second carrier set belong to a first timing advance group TAG 1, and the one or more special carriers in the second carrier set belong to a second timing advance group TAG 2; and the length of the K symbols is not less than a sum of the first duration, the second duration, and the third duration, and the third duration is a length that is agreed on in advance according to a TA difference between the TAG 1 and the TAG 2.

With reference to the eighth aspect, or the first or the second possible implementation of the eighth aspect, in a third possible implementation, the K symbols are the last K OFDM symbols in the second uplink subframe.

With reference to any one of the eighth aspect, or the first to the third possible implementations of the eighth aspect, in a fourth possible implementation, the method further includes:

determining, by the network device, that the terminal device sends a second uplink signal in a third uplink subframe on the one or more special carriers in a third carrier set, and determining that the terminal device cancels sending of M consecutive OFDM symbols of an adjacent subframe of the third uplink subframe, where the adjacent subframe is also an uplink subframe, and the third carrier set includes all carriers in carrier aggregation that are used by the terminal device to send the third uplink subframe; and receiving, by the network device, the second uplink signal on the one or more special carriers in the third carrier set, and canceling receiving of the M consecutive OFDM symbols in the adjacent subframe of the third uplink subframe, where the M OFDM symbols are located on one or more normal carriers in the third carrier set, and M is a positive integer and is not greater than a quantity of OFDM symbols included in the adjacent subframe.

With reference to the fourth possible implementation of the eighth aspect, in a fifth possible implementation, a length of the M OFDM symbols is not less than the fourth duration; and the fourth duration is duration in which the terminal device is switched between carriers.

With reference to the fifth possible implementation of the eighth aspect, in a sixth possible implementation, the one or more normal carriers in the third carrier set belong to a third timing advance group TAG 3, and the one or more special carriers in the third carrier set belong to a fourth timing advance group TAG 4; and the length of the K symbols is not less than a sum of the fourth duration and fifth duration, and the fifth duration is a length that is agreed on in advance according to a TA difference between the TAG 3 and the TAG 4.

With reference to any one of the fourth to the sixth possible implementations of the eighth aspect, in a seventh possible implementation, if the adjacent subframe is a next subframe of the third uplink subframe, the M symbols are the first M OFDM symbols in the next subframe; and/or if the adjacent subframe is a previous subframe of the third uplink subframe, the M symbols are the last M OFDM symbols in the previous subframe.

With reference to any one of the fourth to the seventh possible implementations of the eighth aspect, in an eighth possible implementation, the second uplink signal is an uplink reference signal or a preamble.

With reference to any one of the eighth aspect, or the first to the eighth possible implementations of the eighth aspect, in a ninth possible implementation, the determining, by a network device, that a terminal device cancels sending of K OFDM symbols in a second uplink subframe includes:

if determining that a power sum of the terminal device for sending the second uplink subframe on all the carriers in the second carrier set is greater than a maximum transmit power of the terminal device, determining, by the network device, that the terminal device cancels sending of the K OFDM symbols.

With reference to any one of the eighth aspect, or the first to the eighth possible implementations of the eighth aspect, in a tenth possible implementation, the determining, by a network device, that a terminal device cancels sending of K OFDM symbols in a second uplink subframe includes:

when a quantity of carriers included in the second carrier set is greater than a quantity of uplink carriers that can be simultaneously sent by the terminal device, determining, by the network device, that the terminal device cancels sending of the K OFDM symbols.

With reference to any one of the eighth aspect, or the first to the tenth possible implementations of the eighth aspect, in an eleventh possible implementation, the first uplink signal includes an uplink reference signal and/or a preamble.

With reference to the eighth or the eleventh possible implementation of the eighth aspect, in a twelfth possible implementation, the uplink reference signal is a sounding reference signal SRS.

In embodiments of the present disclosure, the terminal device rejects an uplink subframe on some carriers or some ODFM symbols of an uplink subframe, thereby resolving a problem that information such as downlink channel characteristics of some carriers cannot be obtained when no uplink reference signal (such as an SRS) is sent on these carriers. In addition, a conflict is avoided.

DESCRIPTION OF EMBODIMENTS

Figures 1, 2:
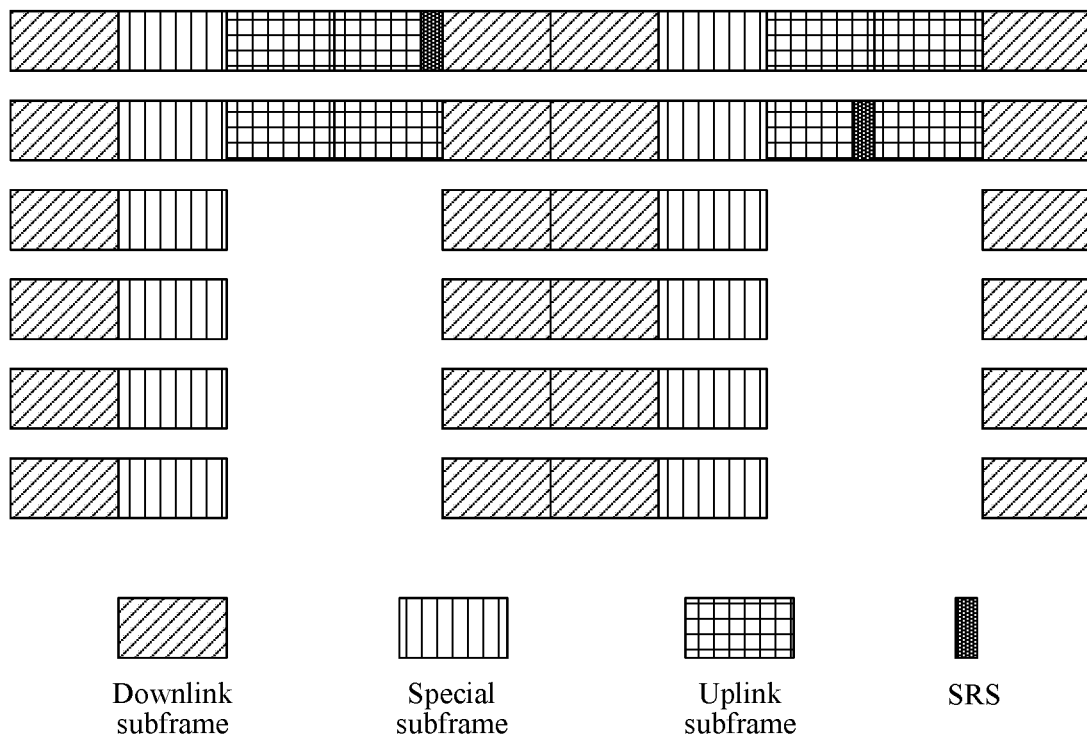
FIG. 1 is a schematic diagram of a principle of carrier aggregation.
FIG. 2 is a schematic diagram of an SRS sending manner in an LTE CA system.
Figure 3:
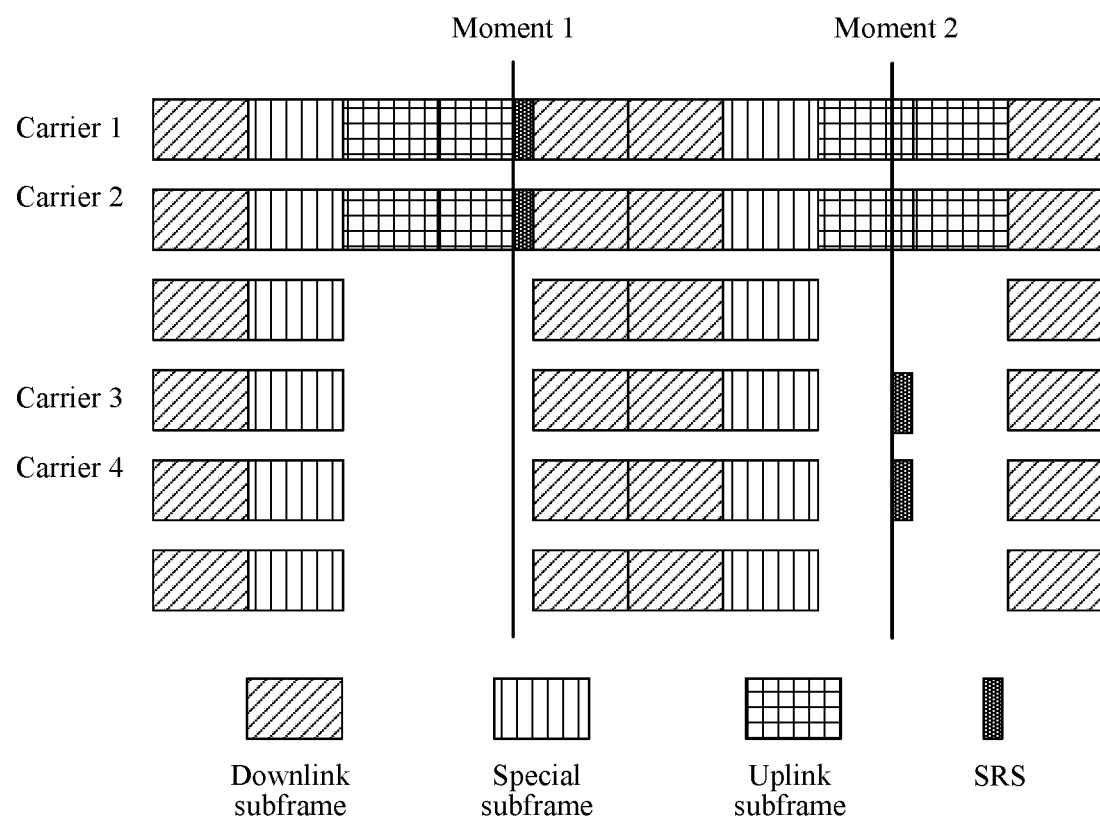
FIG. 3 is a schematic diagram of an uplink SRS only carrier in an LTE CA system.

Generally, in an LTE CA system, a quantity of uplink carriers that can be simultaneously sent by UE is limited. According to this limited uplink sending capability, to obtain, for example, the downlink channel characteristics of the remaining three carriers in FIG. 2, a plurality of uplink carriers may be configured for the UE for simultaneous sending. A quantity of the configured plurality of uplink carriers exceeds a maximum quantity of uplink carriers that can be simultaneously sent by the UE. The UE sends an SRS on different uplink carriers in a time division manner. In this case, an uplink sending capability of the UE is not exceeded at a sending moment. For example, an SRS is sent on a carrier 1 and a carrier 2 at a moment 1 shown in FIG. 3, and an SRS is sent on a carrier 3 and a carrier 4 at a moment 2.

If neither uplink data such as a physical uplink shared channel (PUSCH) nor uplink control information such as a physical uplink control channel (PUCCH) is sent in an uplink subframe on the carrier 3 and the carrier 4, the two carriers are referred to as special carriers, and other carriers are referred to as normal carriers.

The uplink data may be uplink physical layer data, including service data, higher layer signaling, and the like. The uplink control information is physical layer control information, and physical layer uplink control information may be sent by using the PUCCH.

Optionally, the special carrier may be used to send only an SRS in an uplink subframe. In this case, the special carrier may be referred to as a carrier on which only the SRS is sent in uplink (an uplink SRS only carrier). Optionally, the special carrier may be used to send only a preamble in an uplink subframe. In this case, the special carrier may be referred to as a carrier on which only the preamble is sent in uplink (an uplink Preamble only carrier). Optionally, the special carrier may be used to send a preamble and an SRS in an uplink subframe.

The normal carrier may be used to send uplink control information and/or uplink data in an uplink subframe. In addition, the normal carrier may be used to send an uplink signal such as an SRS or a preamble in the uplink subframe.

Figure 4:
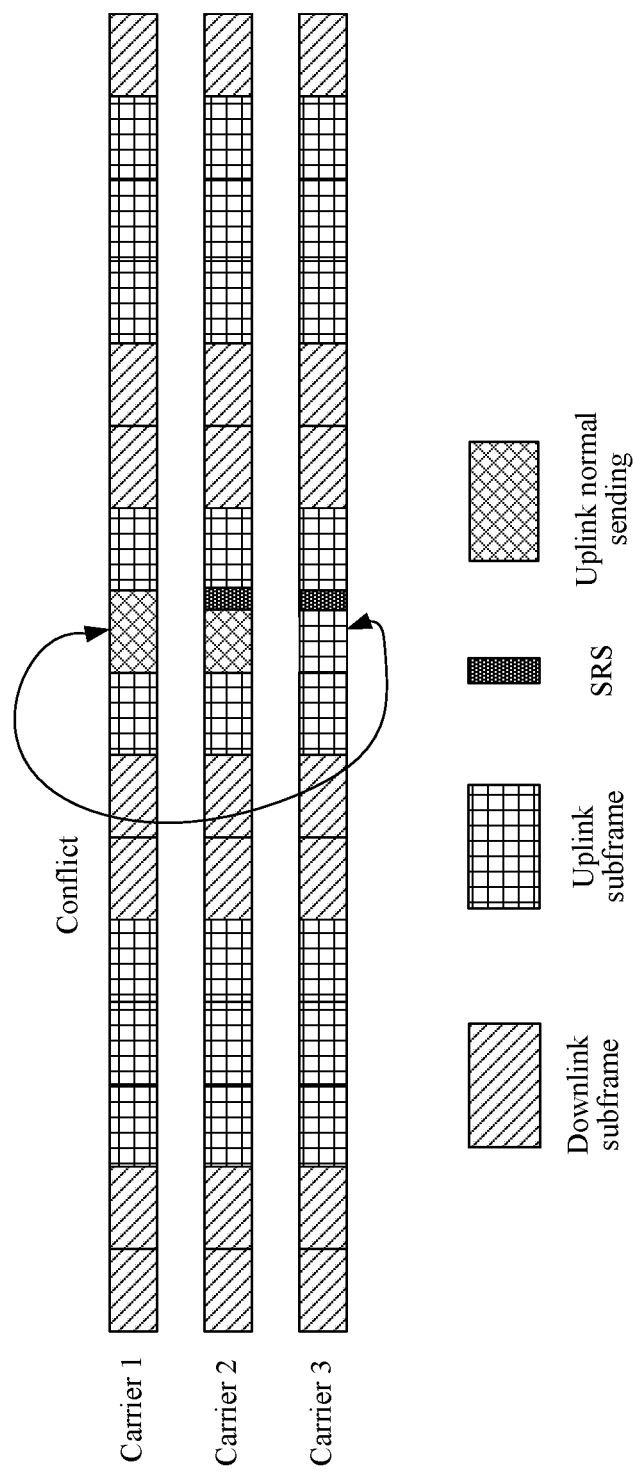
FIG. 4 is a schematic diagram in which simultaneous uplink sending on a normal carrier and a special carrier exceeds an uplink sending capability of UE.

As shown in FIG. 4, the carrier 1 and the carrier 2 are normal carriers, and the carrier 3 is a special carrier. The uplink sending capability of the UE is to simultaneously send a maximum of two uplink carriers.

In a same uplink subframe, when an SRS is sent on the carrier 3, and an SRS and a PUCCH are sent on the carrier 2, if the UE receives uplink scheduling and needs to send a PUSCH in the uplink subframe on the carrier 1, or the UE needs to send a PUCCH in the uplink subframe on the carrier 1 (uplink sending such as PUSCH sending and/or PUCCH sending is referred to as "uplink normal sending"), the uplink sending capability of the UE is exceeded.

In this case, simultaneous uplink sending on the normal carrier and the special carrier may exceed the uplink sending capability of the UE. This case is referred to as a "conflict".

In the embodiments of the present disclosure, a terminal device rejects an uplink subframe on some carriers or some ODFM symbols of an uplink subframe on some carriers, thereby resolving the problem that information such as downlink channel characteristics of some carriers cannot be obtained when no uplink reference signal (such as an SRS) is sent on these carriers. In addition, a conflict is avoided. The following provides detailed descriptions with reference to the accompanying drawings.

In the embodiments of the present disclosure, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 5:
FIG. 5 is a schematic structural diagram of a wireless communications system according to an embodiment of the present disclosure.

FIG. 5 is a schematic structural diagram of a wireless communications system according to an embodiment of the present disclosure. As shown in FIG. 5, the system includes a terminal device 501 and a network device 502. The terminal device 501 is configured to perform uplink sending, and the network device 502 is configured to perform uplink receiving.

A communications standard of the wireless communications system shown in FIG. 5 includes but is not limited to a Global System for Mobile Communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), Time Division Duplex-Long Term Evolution (TDD LTE), Frequency Division Duplex-Long Term Evolution (FDD LTE), Long Term Evolution Advanced (LTE-advanced), a personal handy-phone system (PHS), Wireless Fidelity (WiFi) specified in the 802.11 family of protocols, Worldwide Interoperability for Microwave Access (WiMAX), and various evolved wireless communications systems in future.

This embodiment of the present disclosure can be applied to any wireless communications system supporting carrier aggregation of simultaneous uplink sending on a plurality of carriers, to resolve the problem that information such as downlink channel characteristics of some carriers cannot be obtained when no uplink reference signal is sent on these carriers. In addition, the following problem can be avoided:

Simultaneous uplink sending on a normal carrier and a special carrier may exceed an uplink sending capability of a terminal device.

The terminal device 501 may be a wireless terminal. The wireless terminal may be a device that provides a user with voice and/or data connectivity, a handheld device with a wireless connection function, or another processing device connected to a wireless modem. The wireless terminal may communicate with one or more core networks by using a radio access network. The wireless terminal may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus that exchanges voice and/or data with the radio access network. For example, the wireless terminal may be a device such as a personal communications service (PCS) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a mobile station, a remote station, an access point, a remote terminal, an access terminal, a user terminal, a user agent, a user device, or user equipment.

The network device 502 may include a base station or a radio resource management device for controlling the base station; or may include a base station and a radio resource management for controlling the base station. The base station may be a macro base station, or a micro base station such as a small cell base station or a pico cell base station. The base station may be a home base station, such as a home NodeB (HNB) or a home evolved NodeB (HeNB). The base station may include a relay node (relay) and the like.

For example, for an LTE system such as a TDD LTE system or an LTE-A system, the network device 502 in the wireless communications system provided in this embodiment of the present disclosure may be an evolved NodeB (eNodeB), and the terminal device 501 may be UE. For a TD-SCDMA system, the network device 502 in the wireless communications system provided in this embodiment of the present disclosure may include a NodeB and/or a radio network controller (RNC), and the terminal device 501 may be UE.

This embodiment of the present disclosure provides a plurality of solutions including the following two optional solutions, to resolve a problem that information such as downlink channel characteristics of some carriers cannot be obtained when no uplink reference signal (such as an SRS) is sent on these carriers. In addition, a conflict is avoided. The following separately describes the two solutions in detail.

Optional Solution 1

In optional solution 1, the terminal device 501 selects one or more carriers from a carrier set for an uplink subframe. The carrier set includes all carriers in carrier aggregation that are used by the terminal device 501 to send the uplink subframe. The terminal device 501 cancels sending of the uplink subframe on the selected one or more carriers. The selected one or more carriers are normal carriers or special carriers.

Uplink sending of an uplink subframe is canceled on some normal carriers or special carriers, so that a conflict caused because simultaneous uplink sending on the normal carrier and the special carrier exceeds an uplink sending capability of the terminal device 501 can be avoided.

When one of the following conditions is met, the terminal device 501 may select the one or more carriers from the carrier set, and cancel sending of the uplink subframe on the carriers.

Condition 1

A power sum of the terminal device 501 for sending the uplink subframe on all the carriers in the carrier set is greater than a maximum transmit power of the terminal device 501.

When condition 1 is met, the terminal device 501 may cancel sending of the uplink subframe on the one or more carriers in the carrier set, so that the following case exists:

A power sum of the terminal device 501 for sending the uplink subframe on carriers other than the selected one or more carriers in the carrier set is not greater than the maximum transmit power of the terminal device 501.

Condition 2

A quantity of carriers included in the carrier set is greater than a quantity of uplink carriers that can be simultaneously sent by the terminal device 501.

When condition 2 is met, the terminal device 501 cancels sending of the uplink subframe on the one or more carriers in the carrier set, so that the following case exists:

A quantity of carriers that is obtained by subtracting the selected one or more carriers from the quantity of carriers included in the carrier set is not greater than the quantity of uplink carriers that can be simultaneously sent by the terminal device 501.

Correspondingly, the network device 502 may use a same determining condition as the terminal device 501, for example, condition 1 or condition 2, to determine that the terminal device 501 cancels sending of the uplink subframe on the one or more carriers in the carrier set. In this case, the network device 502 cancels receiving of the uplink subframe on the one or more carriers.

The terminal device 501 and the network device 502 may use a same rule to determine a specific carrier that the terminal device 501 rejects. Because the network device 502 knows a carrier that is used by the terminal device 501 for uplink sending, based on the same rule, the network device 502 may know a carrier that the terminal device 501 rejects. The rule may be any one of the following rules:

1. preferentially rejecting a carrier with a low carrier priority;
2. preferentially rejecting a carrier with a small carrier sequence number;
3. preferentially rejecting a carrier with a large carrier sequence number; or
4. preferentially rejecting a high-frequency carrier.

As described above, the special carrier is a carrier on which the terminal device 501 sends neither uplink data nor uplink control information in uplink. In this case, the terminal device 501 may send only an uplink signal on the special carrier. The uplink signal may be an uplink reference signal or a preamble. Optionally, the uplink reference signal may be an SRS.

Optional Solution 2

In optional solution 2, the terminal device 501 determines to cancel sending of one or more consecutive OFDM symbols of an uplink subframe, and the OFDM symbols that are rejected are located on one or more normal carriers in a carrier set.

The following separately describes two cases.

Case 1

Figure 6:
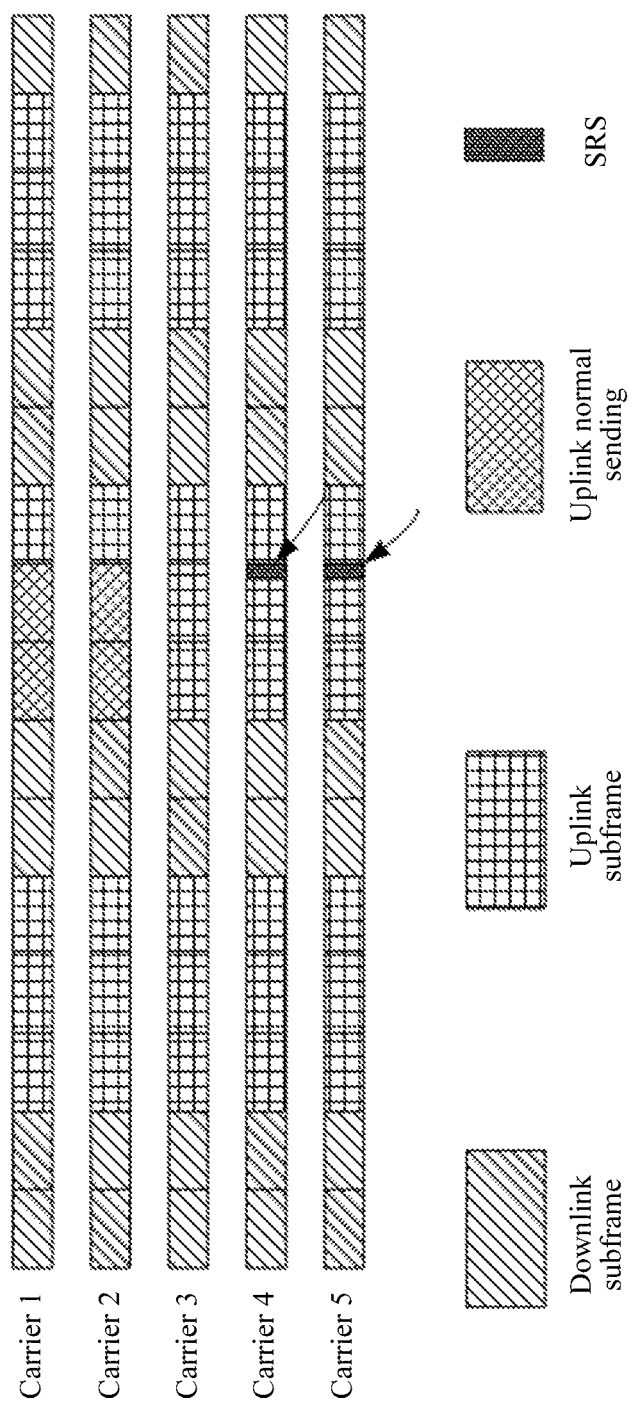
FIG. 6 is a schematic diagram in which simultaneous uplink sending on a normal carrier and a special carrier exceeds an uplink sending capability of UE.

As shown in FIG. 6, if an uplink sending capability of the terminal device 501 is to simultaneously send a maximum of two uplink carriers, a conflict may occur between SRS sending on a carrier 4 and a carrier 5 and uplink normal sending on a carrier 1 and a carrier 2.

Figure 7:
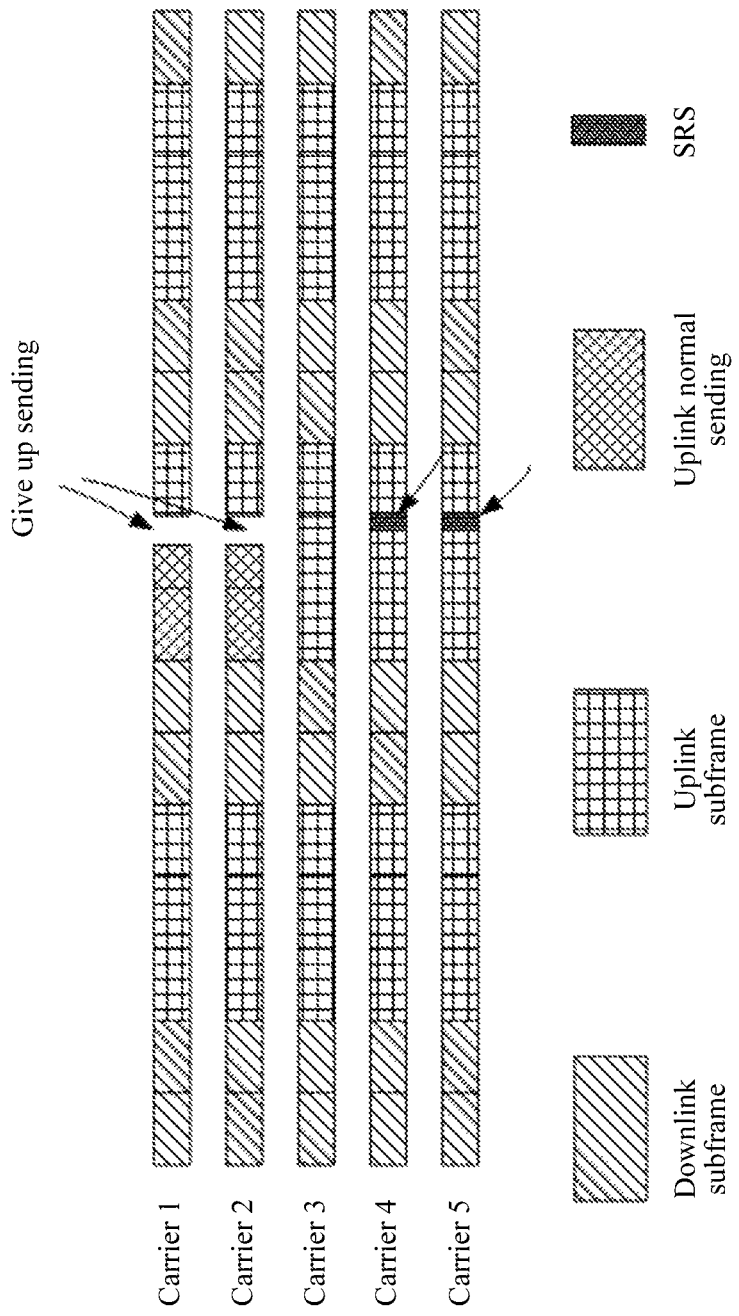
FIG. 7 is a schematic diagram of canceling sending of an uplink subframe on some carriers according to an embodiment of the present disclosure.

In this case, as shown in FIG. 7, uplink sending of some OFDM symbols on normal carriers such as the carrier 1 and the carrier 2 may be canceled, so as to ensure that in a time period in which an SRS is sent on the carrier 4 and the carrier 5, sending is performed only on the carrier 4 and the carrier 5, and the uplink sending capability of the terminal device 501 is not exceeded.

Therefore, in case 1, the terminal device 501 cancels sending of K consecutive OFDM symbols of an uplink subframe. The K OFDM symbols are located on one or more normal carriers in a carrier set. The carrier set includes all carriers in carrier aggregation that are used by the terminal device 501 to send the uplink subframe. K is a positive integer and is not greater than a quantity of OFDM symbols included in the uplink subframe. The terminal device 501 sends an uplink signal in the K symbols on one or more special carriers in the carrier set.

In FIG. 7, the terminal device 501 cancels sending of the K OFDM symbols in the uplink subframe on all normal carriers. Optionally, if an SRS is sent only on the carrier 4, and no SRS is sent on the carrier 5, sending of the uplink subframe may be canceled only on some normal carriers. For example, sending of the K OFDM symbols in the uplink subframe is canceled on the carrier 1 or carrier 2, and the uplink sending capability of the terminal device 501 is not exceeded.

Sending of some OFDM symbols is canceled on the normal carrier, so that a conflict caused because simultaneous uplink sending on the normal carrier and the special carrier exceeds the uplink sending capability of the terminal device 501 can be avoided.

Optionally, a length of the K symbols is not less than a sum of first duration and second duration. For example, the length of the K symbols is equal to the sum of the first duration and the second duration. For another example, the length of the K symbols is greater than the sum of the first duration and the second duration.

The first duration is duration required for sending the uplink signal; and the second duration is duration in which the terminal device 501 is switched between carriers.

If the terminal device 501 supports the normal carrier and the special carrier by using different hardware such as radio-frequency links that do not affect each other, the duration in which the terminal device 501 is switched between carriers may be 0. If hardware by which the terminal device 501 supports the normal carrier and the special carrier affects each other, the duration in which the terminal device 501 is switched between carriers is usually greater than 0.

Optionally, a possible case is as follows: If the one or more normal carriers on which sending of the uplink subframe is canceled belong to a timing advance group (TAG), and the one or more special carriers on which the uplink signal is sent belong to another TAG, the length of the K symbols may be determined according to a TA difference between the two TAGs. Because a TA difference between two TAGs is usually not greater than one symbol, when the length of the K symbols is set, the first duration and the second duration are considered, and sending of one or two OFDM symbols may be considered to be additionally canceled.

Optionally, if the uplink signal is located in the last several OFDM symbols in the uplink subframe, the K symbols may be the last K OFDM symbols in the uplink subframe.

Optionally, if the uplink signal is located in the first several OFDM symbols in the uplink subframe or is located in the entire subframe, the K symbols may be the last K OFDM symbols of a previous subframe of the uplink subframe.

Optionally, when one of the following conditions is met, the terminal device 501 may determine to cancel sending of the K consecutive OFDM symbols in the uplink subframe:

Condition 1

A power sum of the terminal device 501 for sending the uplink subframe on all the carriers in the carrier set is greater than a maximum transmit power of the terminal device 501.

When condition 1 is met, the terminal device 501 may cancel sending of the K consecutive OFDM symbols in the uplink subframe, so that the following case exists:

A power sum of the terminal device 501 for sending the uplink subframe on carriers other than the one or more normal carriers on which the K OFDM symbols are located in the carrier set is not greater than the maximum transmit power of the terminal device 501.

Condition 2

A quantity of carriers included in the carrier set is greater than a quantity of uplink carriers that can be simultaneously sent by the terminal device 501.

When condition 2 is met, the terminal device 501 may cancel sending of the K consecutive OFDM symbols in the uplink subframe, so that the following case exists:

A quantity of carriers that is obtained by subtracting the one or more normal carriers on which the K OFDM symbols are located from the quantity of carriers included in the carrier set is not greater than the quantity of uplink carriers that can be simultaneously sent by the terminal device 501.

Correspondingly, the network device 502 may use a same determining condition as the terminal device 501, for example, condition 1 or condition 2, to determine that the terminal device 501 cancels sending of the K consecutive OFDM symbols in the uplink subframe. In this case, the network device 502 cancels receiving of the K consecutive OFDM symbols in the uplink subframe.

The terminal device 501 and the network device 502 may use a same rule to determine a specific carrier that the terminal device 501 rejects. Because the network device 502 knows a carrier that is used by the terminal device 501 for uplink sending, based on the same rule, the network device 502 may know a carrier that the terminal device 501 rejects. The rule may be any one of the following rules:

1. preferentially rejecting a carrier with a low carrier priority;

2. preferentially rejecting a carrier with a small carrier sequence number;

3. preferentially rejecting a carrier with a large carrier sequence number; or 4. preferentially rejecting a high-frequency carrier.

A rule for defining a value of K may be agreed on in advance between the network device 502 and the terminal device 501.

For example, if the duration required for sending the uplink signal is one symbol, and the duration in which the terminal device 501 is switched between carriers is less than one symbol, the network device 502 and the terminal device 501 may agree on the following case in advance: If the terminal device 501 supports the normal carrier and the special carrier by using different hardware such as radio-frequency links that do not affect each other, the value of K is 1 (because the duration in which the terminal device 501 is switched between carriers is 0); or if hardware by which the terminal device 501 supports the normal carrier and the special carrier affects each other, the value of K is 2.

Case 2

Figure 8:
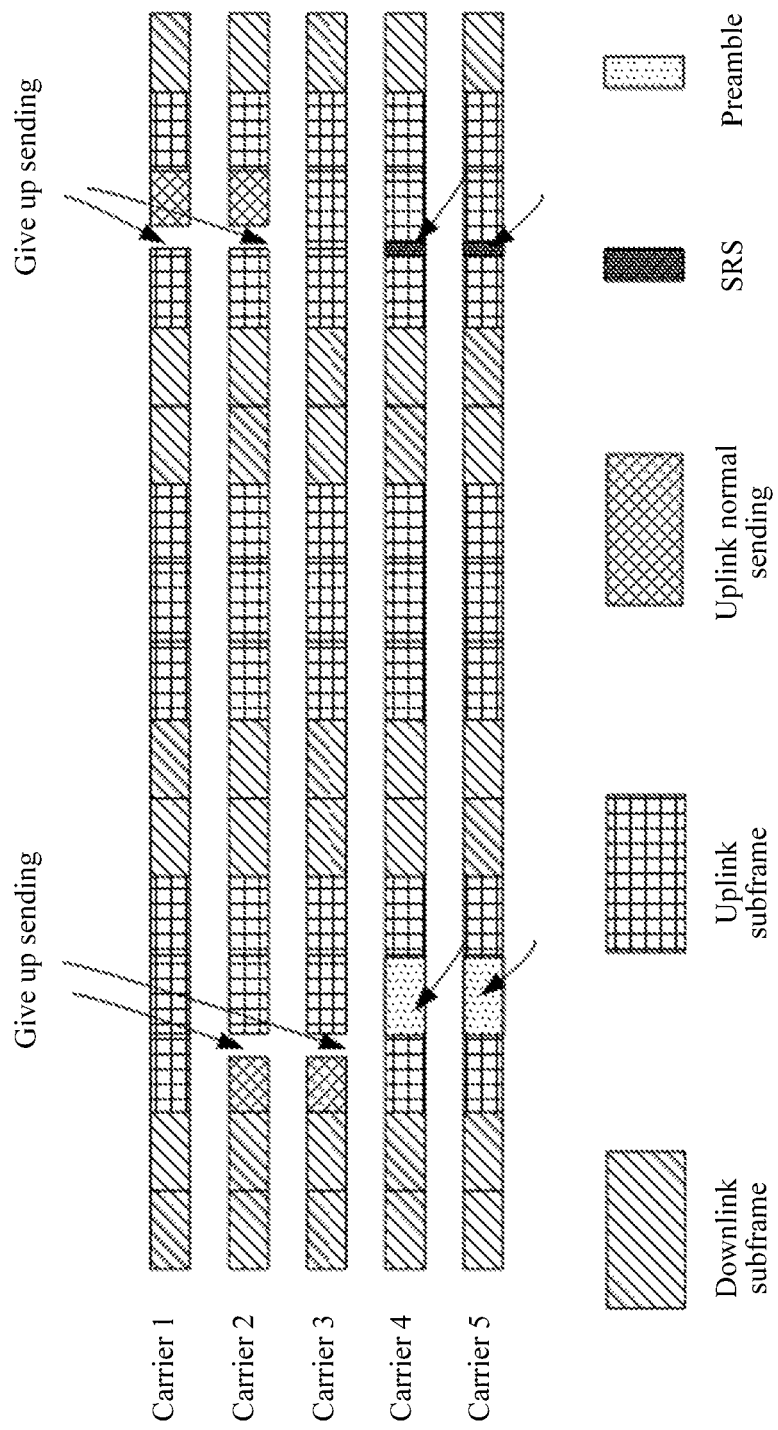
FIG. 8 is a schematic diagram of rejecting some orthogonal frequency division multiplexing (OFDM) symbols on a normal carrier according to an embodiment of the present disclosure.

As shown in FIG. 8, the terminal device 501 is switched from a special carrier to a normal carrier, or is switched from a normal carrier to a special carrier. In this case, M OFDM symbols need to be vacated on the normal carrier, to ensure sending of an uplink signal.

In case 2, the terminal device 501 sends an uplink signal in an uplink subframe on one or more special carriers in a carrier set. The carrier set includes all carriers in carrier aggregation that are used by the terminal device 501 to send the uplink subframe.

The terminal device 501 determines to cancel sending of M consecutive OFDM symbols of an adjacent subframe of the uplink subframe, and the adjacent subframe is also an uplink subframe.

The M OFDM symbols are located on one or more normal carriers in the carrier set, and M is a positive integer and is not greater than a quantity of OFDM symbols included in the adjacent subframe.

Optionally, a length of the M OFDM symbols is not less than duration in which the terminal device 501 is switched between carriers.

If the terminal device 501 supports the normal carrier and the special carrier by using different hardware such as radio-frequency links that do not affect each other, the duration in which the terminal device 501 is switched between carriers may be 0. If hardware by which the terminal device 501 supports the normal carrier and the special carrier affects each other, the duration in which the terminal device 501 is switched between carriers is usually greater than 0.

Optionally, a possible case is as follows: If the one or more normal carriers on which sending of the uplink subframe is canceled belong to a TAG, and the one or more special carriers on which the uplink signal is sent belong to another TAG, the length of the K symbols may be determined according to a TA difference between the two TAGs.

Optionally, if the adjacent subframe is a next subframe of the uplink subframe, the M symbols may be the first M OFDM symbols in the next subframe; or if the adjacent subframe is a previous subframe of the uplink subframe, the M symbols may be the last M OFDM symbols in the previous subframe.

The terminal device 501 and the network device 502 may use a same rule to determine a specific carrier that the terminal device 501 rejects. Because the network device 502 knows a carrier that is used by the terminal device 501 for uplink sending, based on the same rule, the network device 502 may know a carrier that the terminal device 501 rejects. The rule may be any one of the following rules:

1. preferentially rejecting a carrier with a low carrier priority;
2. preferentially rejecting a carrier with a small carrier sequence number;
3. preferentially rejecting a carrier with a large carrier sequence number; or
4. preferentially rejecting a high-frequency carrier.

A rule for defining a value of M may be agreed on in advance between the network device 502 and the terminal device 501.

For example, if the duration in which the terminal device 501 is switched between carriers is less than one symbol, and the network device 502 and the terminal device 501 may agree on the following case in advance:

If the terminal device 501 supports the normal carrier and the special carrier by using different hardware such as radio-frequency links that do not affect each other, the value of M is 0 (because the duration in which the terminal device 501 is switched between carriers is 0); or if hardware by which the terminal device 501 supports the normal carrier and the special carrier affects each other, the value of M is 1.

In case 1 and case 2, the uplink signal sent by the terminal device 501 is an uplink reference signal or a preamble. Optionally, the uplink reference signal is an SRS.

Figure 9:
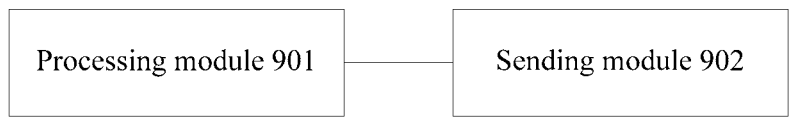
FIG. 9 is a schematic structural diagram of a first terminal device according to an embodiment of the present disclosure.

FIG. 9 is a schematic structural diagram of a first terminal device according to an embodiment of the present disclosure. As shown in FIG. 9, the terminal device includes:

a processing module 901, configured to select one or more carriers from a first carrier set for a first uplink subframe, where the first carrier set includes all carriers in carrier aggregation that are used by the terminal device to send the first uplink subframe; and a sending module 902, configured to cancel sending of the first uplink subframe on the one or more carriers selected by the processing module 901.

The one or more carriers selected by the processing module 901 are normal carriers or special carriers.

The special carrier is a carrier on which the terminal device sends neither uplink data nor uplink control information in uplink, and the normal carrier is a carrier that is used by the terminal device to send uplink data and/or uplink control information.

Optionally, the processing module 901 is specifically configured to:

when a power sum of the terminal device for sending the first uplink subframe on all the carriers in the first carrier set is greater than a maximum transmit power of the terminal device, select the one or more carriers from the first carrier set; and a power sum of the terminal device for sending the first uplink subframe on carriers other than the selected one or more carriers in the first carrier set is not greater than the maximum transmit power of the terminal device.

Optionally, the processing module 901 is specifically configured to:

when a quantity of carriers included in the first carrier set of the terminal device is greater than a quantity of uplink carriers that can be simultaneously sent by the terminal device, select the one or more carriers from the first carrier set; and a quantity of carriers that is obtained by subtracting the one or more carriers from the quantity of carriers included in the first carrier set is not greater than the quantity of uplink carriers that can be simultaneously sent by the terminal device.

Optionally, the special carrier is a carrier on which the terminal device sends only an uplink signal in uplink, and the uplink signal includes an uplink reference signal and/or a preamble.

Optionally, the uplink reference signal is a sounding reference signal SRS.

For a communications standard of a wireless communications system in which the terminal device is located, refer to the wireless communications system shown in FIG. 5. For various types of the terminal device, refer to the type of the terminal device 501.

For another optional implementation of the processing module 901, refer to the solution in which the terminal device 501 performs control processing in optional solution 1 of the wireless communications system shown in FIG. 5. For another optional implementation of the sending module 902, refer to the solution in which the terminal device 501 performs sending in optional solution 1 of the wireless communications system shown in FIG. 5.

For a condition that is used by the processing module 901 to select a carrier on which sending of an uplink subframe is canceled, refer to condition 1 and condition 2 in optional solution 1 of the wireless communications system shown in FIG. 5. For a rule in which the processing module 901 selects a carrier on which sending is canceled, refer to the selection rule in optional solution 1 of the wireless communications system shown in FIG. 5.

The processing module 901 may be implemented by one or more processors, and the sending module 902 may be implemented by one or more transmitters.

Figure 10:
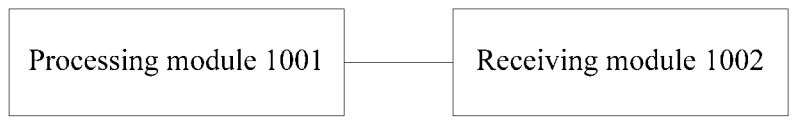
FIG. 10 is a schematic structural diagram of a first network device according to an embodiment of the present disclosure.

FIG. 10 is a schematic structural diagram of a first network device according to an embodiment of the present disclosure. As shown in FIG. 10, the network device includes:

a processing module 1001, configured to determine that a terminal device cancels sending of a first uplink subframe on one or more carriers in a first carrier set, where the first carrier set includes all carriers in carrier aggregation that are used by the terminal device to send the first uplink subframe; and a receiving module 1002, configured to cancel receiving of the first uplink subframe on the one or more carriers.

The one or more carriers are normal carriers or special carriers.

The special carrier is a carrier on which the terminal device sends neither uplink data nor uplink control information in uplink, and the normal carrier is a carrier that is used by the terminal device to send uplink data and/or uplink control information.

Optionally, the processing module 1001 is specifically configured to:

if determining that a power sum of the terminal device for sending the first uplink subframe on all the carriers in the first carrier set is greater than a maximum transmit power of the terminal device, determine that the terminal device cancels sending of the first uplink subframe on the one or more carriers in the first carrier set.

Optionally, the processing module 1001 is specifically configured to:

when a quantity of carriers included in the first carrier set is greater than a quantity of uplink carriers that can be simultaneously sent by the terminal device, determine that the terminal device cancels sending of the first uplink subframe on the one or more carriers in the first carrier set.

Optionally, the special carrier is a carrier on which the terminal device sends only an uplink signal in uplink, and the uplink signal includes an uplink reference signal and/or a preamble.

Optionally, the uplink reference signal is a sounding reference signal SRS.

For a communications standard of a wireless communications system in which the network device is located, refer to the wireless communications system shown in FIG. 5. For various types of the network device, refer to the type of the network device 502.

For another optional implementation of the processing module 1001, refer to the solution in which the network device 502 performs control processing in optional solution 1 of the wireless communications system shown in FIG. 5. For another optional implementation of the receiving module 1002, refer to the solution in which the network device 502 performs receiving in optional solution 1 of the wireless communications system shown in FIG. 5.

For a condition that is used by the processing module 1001 to determine that the terminal device cancels sending of an uplink subframe on a carrier, refer to condition 1 and condition 2 in optional solution 1 of the wireless communications system shown in FIG. 5. For a rule in which the network device 502 determines a carrier on which the terminal device 501 cancels sending, refer to the rule in optional solution 1 of the wireless communications system shown in FIG. 5.

The processing module 1001 may be implemented by one or more processors, and the receiving module 1002 may be implemented by one or more receivers.

Figure 11:
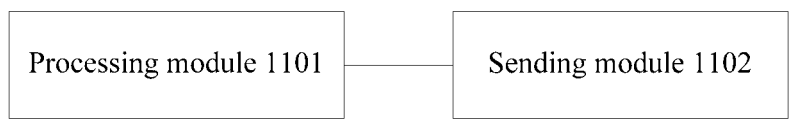
FIG. 11 is a schematic structural diagram of a second terminal device according to an embodiment of the present disclosure.

FIG. 11 is a schematic structural diagram of a second terminal device according to an embodiment of the present disclosure. As shown in FIG. 11, the terminal device includes:

a processing module 1101, configured to determine that the terminal device cancels sending of K consecutive orthogonal frequency division multiplexing OFDM symbols in a second uplink subframe, where the K OFDM symbols are located on one or more normal carriers in a second carrier set, the second carrier set includes all carriers in carrier aggregation that are used by the terminal device to send the second uplink subframe, and K is a positive integer and is not greater than a quantity of OFDM symbols included in the second uplink subframe; and a sending module 1102, configured to send a first uplink signal in the K symbols on one or more special carriers in the second carrier set.

The special carrier is a carrier on which the terminal device sends neither uplink data nor uplink control information in uplink, and the normal carrier is a carrier that is used by the terminal device to send uplink data and/or uplink control information.

Optionally, a length of the K symbols is not less than a sum of first duration and second duration.

The first duration is duration required for sending the first uplink signal.

The second duration is duration in which the terminal device is switched between carriers.

Optionally, the one or more normal carriers in the second carrier set belong to a first timing advance group TAG 1, and the one or more special carriers in the second carrier set belong to a second timing advance group TAG 2.

The length of the K symbols is not less than a sum of the first duration, the second duration, and the third duration, and the third duration is a length that is agreed on in advance according to a TA difference between the TAG 1 and the TAG 2.

Optionally, the K symbols are the last K OFDM symbols in the second uplink subframe.

Optionally, the sending module 1102 is further configured to: send a second uplink signal in a third uplink subframe on the one or more special carriers in a third carrier set. The third carrier set includes all carriers in carrier aggregation that are used by the terminal device to send the third uplink subframe.

The processing module 1101 is further configured to determine that the terminal device cancels sending of M consecutive OFDM symbols of an adjacent subframe of the third uplink subframe. The adjacent subframe is also an uplink subframe.

The M OFDM symbols are located on one or more normal carriers in the third carrier set, and M is a positive integer and is not greater than a quantity of OFDM symbols included in the adjacent subframe.

Optionally, a length of the M OFDM symbols is not less than the fourth duration.

The fourth duration is duration in which the terminal device is switched between carriers.

Optionally, the one or more normal carriers in the third carrier set belong to a third timing advance group TAG 3, and the one or more special carriers in the third carrier set belong to a fourth timing advance group TAG 4.

The length of the K symbols is not less than a sum of the fourth duration and fifth duration, and the fifth duration is a length that is agreed on in advance according to a TA difference between the TAG 3 and the TAG 4.

Optionally, if the adjacent subframe is a next subframe of the third uplink subframe, the M symbols are the first M OFDM symbols in the next subframe; and/or if the adjacent subframe is a previous subframe of the third uplink subframe, the M symbols are the last M OFDM symbols in the previous subframe.

Optionally, the second uplink signal includes an uplink reference signal and/or a preamble.

Optionally, the processing module 1101 is specifically configured to:

when a power sum of the terminal device for sending the second uplink subframe on all the carriers in the second carrier set is greater than a maximum transmit power of the terminal device, determine that the terminal device cancels sending of the K OFDM symbols; and a power sum of the terminal device for sending the second uplink subframe on carriers other than the one or more normal carriers on which the K OFDM symbols are located in the second carrier set is not greater than the maximum transmit power of the terminal device.

Optionally, the processing module 1101 is specifically configured to:

when a quantity of carriers included in the second carrier set of the terminal device is greater than a quantity of uplink carriers that can be simultaneously sent by the terminal device, determine that the terminal device cancels sending of the K OFDM symbols; and a quantity of carriers that is obtained by subtracting the one or more normal carriers on which the K OFDM symbols are located from the quantity of carriers included in the second carrier set is not greater than the quantity of uplink carriers that can be simultaneously sent by the terminal device.

Optionally, the first uplink signal includes an uplink reference signal and/or a preamble.

Optionally, the uplink reference signal is a sounding reference signal SRS.

For a communications standard of a wireless communications system in which the terminal device is located, refer to the wireless communications system shown in FIG. 5. For various types of the terminal device, refer to the type of the terminal device 501.

For another optional implementation of the processing module 1101, refer to the solution in which the terminal device 501 performs control processing in optional solution 2 of the wireless communications system shown in FIG. 5. For another optional implementation of the sending module 1102, refer to the solution in which the terminal device 501 performs sending in optional solution 2 of the wireless communications system shown in FIG. 5.

For two cases existing when the processing module 1101 performs processing, refer to the two cases in optional solution 2 of the wireless communications system shown in FIG. 5. In case 1, for a condition that is used by the processing module 1101 to select a carrier on which sending of some OFDM symbols is canceled, refer to condition 1 and condition 2 in case 1 in optional solution 2 of the wireless communications system shown in FIG. 5. In case 2, which is similar to case 2 in optional solution 2 of the wireless communications system shown in FIG. 5, the processing module 1101 may cancel sending of some OFDM symbols on a normal carrier during a switchover between the special carrier and the normal carrier. For a rule in which the processing module 1101 selects a carrier on which sending is canceled, refer to the selection rule in optional solution 2 of the wireless communications system shown in FIG. 5.

The processing module 1101 may be implemented by one or more processors, and the sending module 1102 may be implemented by one or more transmitters.

Figure 12:
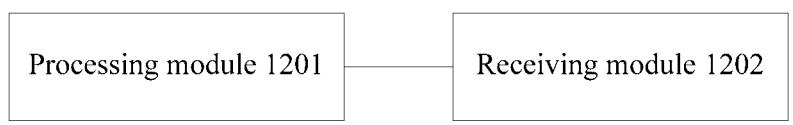
FIG. 12 is a schematic structural diagram of a second network device according to an embodiment of the present disclosure.

FIG. 12 is a schematic structural diagram of a second network device according to an embodiment of the present disclosure. As shown in FIG. 12, the network device includes:

a processing module 1201, configured to: determine that a terminal device cancels sending of K consecutive orthogonal frequency division multiplexing OFDM symbols in a second uplink subframe, and determine that the terminal device sends a first uplink signal in the K symbols on one or more special carriers in the second carrier set, where the K OFDM symbols are located on one or more normal carriers in the second carrier set, the second carrier set includes all carriers in carrier aggregation that are used by the terminal device to send the second uplink subframe, and K is a positive integer and is not greater than a quantity of OFDM symbols included in the second uplink subframe; and a receiving module 1202, configured to: cancel receiving of the K OFDM symbols, and receive the second uplink signal in the K symbols on the one or more special carriers in the second carrier set.

The special carrier is a carrier on which the terminal device sends neither uplink data nor uplink control information in uplink, and the normal carrier is a carrier that is used by the terminal device to send uplink data and/or uplink control information.

Optionally, a length of the K symbols is not less than a sum of first duration and second duration.

The first duration is duration required for sending the first uplink signal.

The second duration is duration in which the terminal device is switched between carriers.

Optionally, the one or more normal carriers in the second carrier set belong to a first timing advance group TAG 1, and the one or more special carriers in the second carrier set belong to a second timing advance group TAG 2.

The length of the K symbols is not less than a sum of the first duration, the second duration, and the third duration, and the third duration is a length that is agreed on in advance according to a TA difference between the TAG 1 and the TAG 2.

Optionally, the K symbols are the last K OFDM symbols in the second uplink subframe.

Optionally, the processing module 1201 is further configured to: determine that the terminal device sends a second uplink signal in a third uplink subframe on the one or more special carriers in a third carrier set, and determine that the terminal device cancels sending of M consecutive OFDM symbols of an adjacent subframe of the third uplink subframe. The adjacent subframe is also an uplink subframe. The third carrier set includes all carriers in carrier aggregation that are used by the terminal device to send the third uplink subframe.

The receiving module 1202 is further configured to: receive the second uplink signal on the one or more special carriers in the third carrier set, and cancel receiving of the M consecutive OFDM symbols in the adjacent subframe of the third uplink subframe.

The M OFDM symbols are located on one or more normal carriers in the third carrier set, and M is a positive integer and is not greater than a quantity of OFDM symbols included in the adjacent subframe.

Optionally, a length of the M OFDM symbols is not less than the fourth duration.

The fourth duration is duration in which the terminal device is switched between carriers.

Optionally, the one or more normal carriers in the third carrier set belong to a third timing advance group TAG 3, and the one or more special carriers in the third carrier set belong to a fourth timing advance group TAG 4.

The length of the K symbols is not less than a sum of the fourth duration and fifth duration, and the fifth duration is a length that is agreed on in advance according to a TA difference between the TAG 3 and the TAG 4.

Optionally, if the adjacent subframe is a next subframe of the third uplink subframe, the M symbols are the first M OFDM symbols in the next subframe; and/or if the adjacent subframe is a previous subframe of the third uplink subframe, the M symbols are the last M OFDM symbols in the previous subframe.

Optionally, the second uplink signal is an uplink reference signal or a preamble.

Optionally, the processing module 1201 is specifically configured to:

if determining that a power sum of the terminal device for sending the second uplink subframe on all the carriers in the second carrier set is greater than a maximum transmit power of the terminal device, determine that the terminal device cancels sending of the K OFDM symbols.

Optionally, the processing module 1201 is specifically configured to:

when a quantity of carriers included in the second carrier set is greater than a quantity of uplink carriers that can be simultaneously sent by the terminal device, determine that the terminal device cancels sending of the K OFDM symbols.

Optionally, the first uplink signal includes an uplink reference signal and/or a preamble.

Optionally, the uplink reference signal is a sounding reference signal SRS.

For a communications standard of a wireless communications system in which the network device is located, refer to the wireless communications system shown in FIG. 5. For various types of the network device, refer to the type of the network device 502.

For another optional implementation of the processing module 1201, refer to the solution in which the network device 502 performs control processing in optional solution 2 of the wireless communications system shown in FIG. 5. For another optional implementation of the receiving module 1202, refer to the solution in which the network device 502 performs receiving in optional solution 2 of the wireless communications system shown in FIG. 5.

For two cases existing when the processing module 1201 performs processing, refer to the two cases in optional solution 2 of the wireless communications system shown in FIG. 5. In case 1, for a condition that is used by the processing module 1201 to determine that the terminal device cancels sending of some OFDM symbols on a carrier, refer to condition 1 and condition 2 in case 1 in optional solution 2 of the wireless communications system shown in FIG. 5. In case 2, which is similar to case 2 in optional solution 2 of the wireless communications system shown in FIG. 5, the processing module 1201 may determine that the terminal device cancels sending of some OFDM symbols on a normal carrier during a switchover between the special carrier and the normal carrier. For a rule in which the processing module 1201 determines a carrier on which the terminal device cancels sending, refer to the rule in optional solution 2 of the wireless communications system shown in FIG. 5.

The processing module 1201 may be implemented by one or more processors, and the receiving module 1202 may be implemented by one or more receivers.

Figure 13:
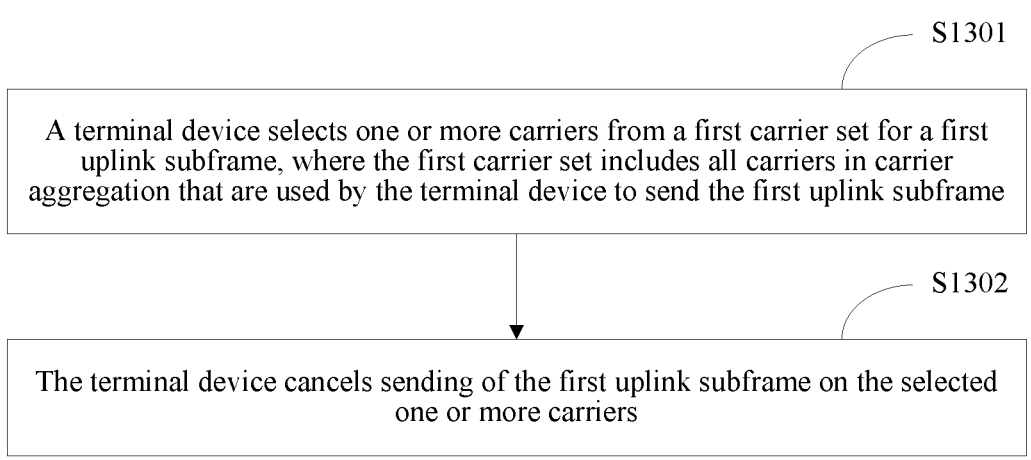
FIG. 13 is a flowchart of a first method for sending an uplink signal according to an embodiment of the present disclosure.

FIG. 13 is a flowchart of a first method for sending an uplink signal according to an embodiment of the present disclosure. As shown in FIG. 13, the method includes the following steps:

S1301. A terminal device selects one or more carriers from a first carrier set for a first uplink subframe, where the first carrier set includes all carriers in carrier aggregation that are used by the terminal device to send the first uplink subframe.

S1302. The terminal device cancels sending of the first uplink subframe on the selected one or more carriers.

The selected one or more carriers are normal carriers or special carriers.

The special carrier is a carrier on which the terminal device sends neither uplink data nor uplink control information in uplink, and the normal carrier is a carrier that is used by the terminal device to send uplink data and/or uplink control information.

Optionally, that a terminal device selects one or more carriers from a first carrier set includes:

when a power sum of the terminal device for sending the first uplink subframe on all the carriers in the first carrier set is greater than a maximum transmit power of the terminal device, selecting the one or more carriers from the first carrier set; and a power sum of the terminal device for sending the first uplink subframe on carriers other than the selected one or more carriers in the first carrier set is not greater than the maximum transmit power of the terminal device.

Optionally, that a terminal device selects one or more carriers from a first carrier set includes:

when a quantity of carriers included in the first carrier set of the terminal device is greater than a quantity of uplink carriers that can be simultaneously sent by the terminal device, selecting the one or more carriers from the first carrier set; and a quantity of carriers that is obtained by subtracting the one or more carriers from the quantity of carriers included in the first carrier set is not greater than the quantity of uplink carriers that can be simultaneously sent by the terminal device.

Optionally, the special carrier is a carrier on which the terminal device sends only an uplink signal in uplink, and the uplink signal includes an uplink reference signal and/or a preamble.

Optionally, the uplink reference signal is a sounding reference signal SRS.

In the method, for a communications standard of a wireless communications system in which the terminal device and a network device are located, refer to the wireless communications system shown in FIG. 5. For various types of the terminal device, refer to the type of the terminal device 501. For various types of the network device, refer to the type of the network device 502.

For another optional solution of the method, refer to processing of the terminal device 501 in optional solution 1 of the wireless communications system shown in FIG. 5. For example, for a condition that is used by the terminal device to select a carrier on which sending of an uplink subframe is canceled, refer to the processing of the terminal device 501 in condition 1 and condition 2 in optional solution 1 of the wireless communications system shown in FIG. 5. For a rule in which the terminal device selects a carrier on which sending is canceled, refer to the selection rule in optional solution 1 of the wireless communications system shown in FIG. 5.

Figure 14:
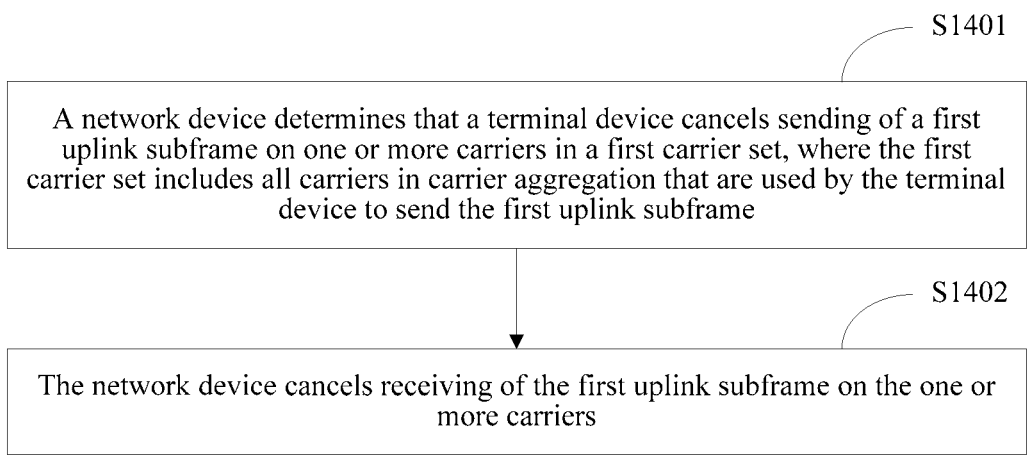
FIG. 14 is a flowchart of a first method for receiving an uplink signal according to an embodiment of the present disclosure.

FIG. 14 is a flowchart of a first method for receiving an uplink signal according to an embodiment of the present disclosure. As shown in FIG. 14, the method includes the following steps:

S1401. A network device determines that a terminal device cancels sending of a first uplink subframe on one or more carriers in a first carrier set, where the first carrier set includes all carriers in carrier aggregation that are used by the terminal device to send the first uplink subframe.

S1402. The network device cancels receiving of the first uplink subframe on the one or more carriers.

The one or more carriers are normal carriers or special carriers.

The special carrier is a carrier on which the terminal device sends neither uplink data nor uplink control information in uplink, and the normal carrier is a carrier that is used by the terminal device to send uplink data and/or uplink control information.

Optionally, that a network device determines that a terminal device cancels sending of a first uplink subframe on one or more carriers in a first carrier set includes:

if determining that a power sum of the terminal device for sending the first uplink subframe on all the carriers in the first carrier set is greater than a maximum transmit power of the terminal device, determining, by the network device, that the terminal device cancels sending of the first uplink subframe on the one or more carriers in the first carrier set.

Optionally, that a network device determines that a terminal device cancels sending of a first uplink subframe on one or more carriers in a first carrier set includes:

when a quantity of carriers included in the first carrier set is greater than a quantity of uplink carriers that can be simultaneously sent by the terminal device, determining, by the network device, that the terminal device cancels sending of the first uplink subframe on the one or more carriers in the first carrier set.

Optionally, the special carrier is a carrier on which the terminal device sends only an uplink signal in uplink, and the uplink signal includes an uplink reference signal and/or a preamble.

Optionally, the uplink reference signal is a sounding reference signal SRS.

In the method, for a communications standard of a wireless communications system in which the network device and the terminal device are located, refer to the wireless communications system shown in FIG. 5. For various types of the network device, refer to the type of the network device 502. For various types of the terminal device, refer to the type of the terminal device 501.

For another optional implementation of the method, refer to processing of the network device 502 in optional solution 2 of the wireless communications system shown in FIG. 5.

For a condition that is used by the network device to determine that the terminal device cancels sending of an uplink subframe on a carrier, refer to condition 1 and condition 2 in optional solution 1 of the wireless communications system shown in FIG. 5. For a rule in which the network device 502 determines a carrier on which the terminal device 501 cancels sending, refer to the rule in optional solution 1 of the wireless communications system shown in FIG. 5.

Figure 15:
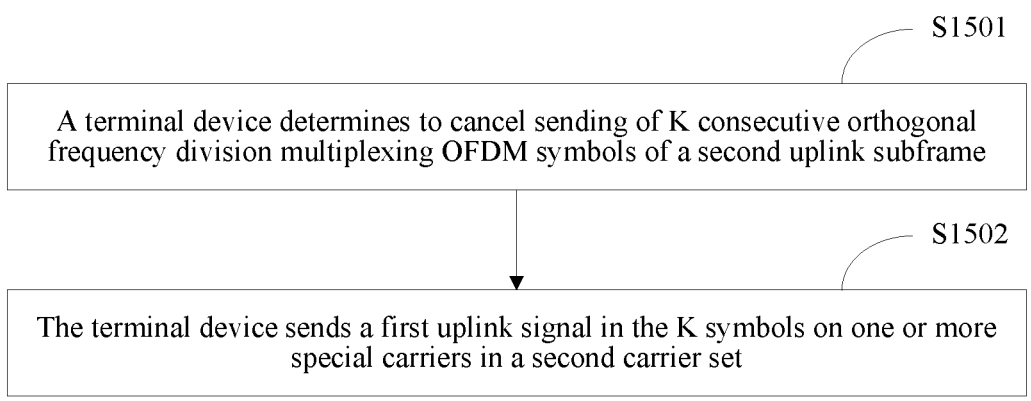
FIG. 15 is a flowchart of a second method for sending an uplink signal according to an embodiment of the present disclosure.

FIG. 15 is a flowchart of a second method for sending an uplink signal according to an embodiment of the present disclosure.

S1501. A terminal device determines to cancel sending of K consecutive orthogonal frequency division multiplexing OFDM symbols in a second uplink subframe.

The K OFDM symbols are located on one or more normal carriers in a second carrier set, the second carrier set includes all carriers in carrier aggregation that are used by the terminal device to send the second uplink subframe, and K is a positive integer and is not greater than a quantity of OFDM symbols included in the second uplink subframe.

S1502. The terminal device sends a first uplink signal in the K symbols on one or more special carriers in a second carrier set.

The special carrier is a carrier on which the terminal device sends neither uplink data nor uplink control information in uplink, and the normal carrier is a carrier that is used by the terminal device to send uplink data and/or uplink control information.

Optionally, a length of the K symbols is not less than a sum of first duration and second duration.

The first duration is duration required for sending the first uplink signal.

The second duration is duration in which the terminal device is switched between carriers.

Optionally, the one or more normal carriers in the second carrier set belong to a first timing advance group TAG 1, and the one or more special carriers in the second carrier set belong to a second timing advance group TAG 2.

The length of the K symbols is not less than a sum of the first duration, the second duration, and the third duration, and the third duration is a length that is agreed on in advance according to a TA difference between the TAG 1 and the TAG 2.

Optionally, the K symbols are the last K OFDM symbols in the second uplink subframe.

Optionally, the terminal device sends a second uplink signal in a third uplink subframe on the one or more special carriers in a third carrier set. The third carrier set includes all carriers in carrier aggregation that are used by the terminal device to send the third uplink subframe.

The terminal device determines to cancel sending of M consecutive OFDM symbols of an adjacent subframe of the third uplink subframe. The adjacent subframe is also an uplink subframe.

The M OFDM symbols are located on one or more normal carriers in the third carrier set, and M is a positive integer and is not greater than a quantity of OFDM symbols included in the adjacent subframe.

Optionally, a length of the M OFDM symbols is not less than the fourth duration.

The fourth duration is duration in which the terminal device is switched between carriers.

Optionally, the one or more normal carriers in the third carrier set belong to a third timing advance group TAG 3, and the one or more special carriers in the third carrier set belong to a fourth timing advance group TAG 4.

The length of the K symbols is not less than a sum of the fourth duration and fifth duration, and the fifth duration is a length that is agreed on in advance according to a TA difference between the TAG 3 and the TAG 4.

Optionally, if the adjacent subframe is a next subframe of the third uplink subframe, the M symbols are the first M OFDM symbols in the next subframe; and/or if the adjacent subframe is a previous subframe of the third uplink subframe, the M symbols are the last M OFDM symbols in the previous subframe.

Optionally, the second uplink signal includes an uplink reference signal and/or a preamble.

Optionally, that a terminal device determines to cancel sending of K consecutive OFDM symbols in a second uplink subframe includes:

when a power sum of the terminal device for sending the second uplink subframe on all the carriers in the second carrier set is greater than a maximum transmit power of the terminal device, determining to cancel sending of the K OFDM symbols; and a power sum of the terminal device for sending the second uplink subframe on carriers other than the one or more normal carriers on which the K OFDM symbols are located in the second carrier set is not greater than the maximum transmit power of the terminal device.

Optionally, that a terminal device determines to cancel sending of K consecutive OFDM symbols in a second uplink subframe includes:

when a quantity of carriers included in the second carrier set of the terminal device is greater than a quantity of uplink carriers that can be simultaneously sent by the terminal device, determining to cancel sending of the K OFDM symbols; and a quantity of carriers that is obtained by subtracting the one or more normal carriers on which the K OFDM symbols are located from the quantity of carriers included in the second carrier set is not greater than the quantity of uplink carriers that can be simultaneously sent by the terminal device.

Optionally, the first uplink signal includes an uplink reference signal and/or a preamble.

Optionally, the uplink reference signal is a sounding reference signal SRS.

In the method, for a communications standard of a wireless communications system in which the terminal device and a network device are located, refer to the wireless communications system shown in FIG. 5. For various types of the terminal device, refer to the type of the terminal device 501. For various types of the network device, refer to the type of the network device 502.

For another optional implementation of the method, refer to processing on a terminal device 501 side in optional solution 2 of the wireless communications system shown in FIG. 5.

For two cases existing when the terminal device performs processing, refer to the two cases in optional solution 2 of the wireless communications system shown in FIG. 5. In case 1, for a condition that is used by the terminal device to select a carrier on which sending of some OFDM symbols is canceled, refer to condition 1 and condition 2 in case 1 in optional solution 2 of the wireless communications system shown in FIG. 5. In case 2, which is similar to case 2 in optional solution 2 of the wireless communications system shown in FIG. 5, the terminal device may cancel sending of some OFDM symbols on a normal carrier during a switchover between the special carrier and the normal carrier. For a rule in which the terminal device selects a carrier on which sending is canceled, refer to the selection rule in optional solution 2 of the wireless communications system shown in FIG. 5.

Figure 16:
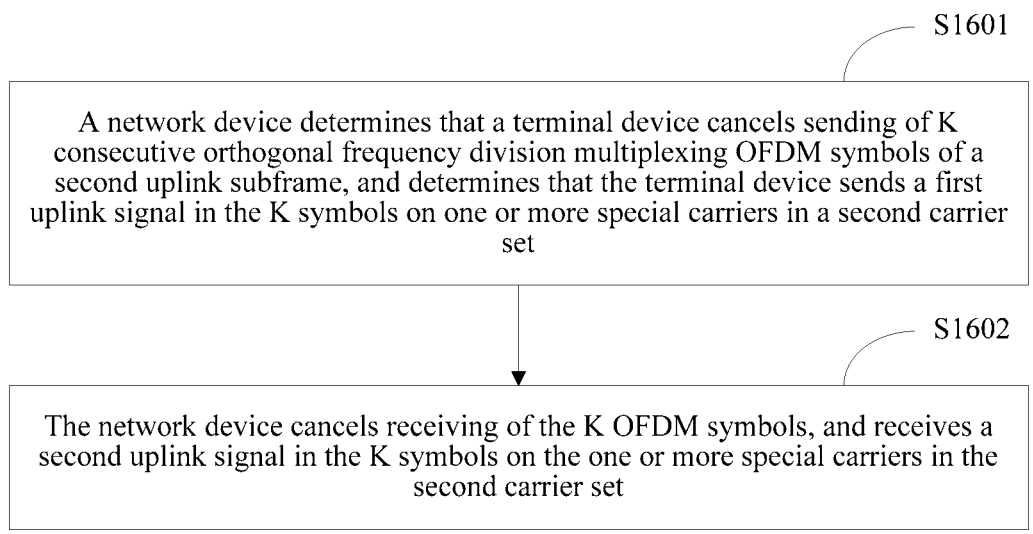
FIG. 16 is a flowchart of a second method for receiving an uplink signal according to an embodiment of the present disclosure.

FIG. 16 is a flowchart of a second method for receiving an uplink signal according to an embodiment of the present disclosure. As shown in FIG. 16, the method includes the following steps:

S1601. A network device determines that a terminal device cancels sending of K consecutive orthogonal frequency division multiplexing OFDM symbols in a second uplink subframe, and determines that the terminal device sends a first uplink signal in the K symbols on one or more special carriers in the second carrier set.

The K OFDM symbols are located on one or more normal carriers in the second carrier set, the second carrier set includes all carriers in carrier aggregation that are used by the terminal device to send the second uplink subframe, and K is a positive integer and is not greater than a quantity of OFDM symbols included in the second uplink subframe.

S1602. The network device cancels receiving of the K OFDM symbols, and receives the second uplink signal in the K symbols on the one or more special carriers in the second carrier set.

The special carrier is a carrier on which the terminal device sends neither uplink data nor uplink control information in uplink, and the normal carrier is a carrier that is used by the terminal device to send uplink data and/or uplink control information.

Optionally, a length of the K symbols is not less than a sum of first duration and second duration.

The first duration is duration required for sending the first uplink signal.

The second duration is duration in which the terminal device is switched between carriers.

Optionally, the one or more normal carriers in the second carrier set belong to a first timing advance group TAG 1, and the one or more special carriers in the second carrier set belong to a second timing advance group TAG 2.

The length of the K symbols is not less than a sum of the first duration, the second duration, and the third duration, and the third duration is a length that is agreed on in advance according to a TA difference between the TAG 1 and the TAG 2.

Optionally, the K symbols are the last K OFDM symbols in the second uplink subframe.

Optionally, the method further includes:

determining, by the network device, that the terminal device sends a second uplink signal in a third uplink subframe on the one or more special carriers in a third carrier set, and determining that the terminal device cancels sending of M consecutive OFDM symbols of an adjacent subframe of the third uplink subframe, where the adjacent subframe is also an uplink subframe, and the third carrier set includes all carriers in carrier aggregation that are used by the terminal device to send the third uplink subframe; and receiving, by the network device, the second uplink signal on the one or more special carriers in the third carrier set, and canceling receiving of the M consecutive OFDM symbols in the adjacent subframe of the third uplink subframe.

The M OFDM symbols are located on one or more normal carriers in the third carrier set, and M is a positive integer and is not greater than a quantity of OFDM symbols included in the adjacent subframe.

Optionally, a length of the M OFDM symbols is not less than the fourth duration.

The fourth duration is duration in which the terminal device is switched between carriers.

Optionally, the one or more normal carriers in the third carrier set belong to a third timing advance group TAG 3, and the one or more special carriers in the third carrier set belong to a fourth timing advance group TAG 4.

The length of the K symbols is not less than a sum of the fourth duration and fifth duration, and the fifth duration is a length that is agreed on in advance according to a TA difference between the TAG 3 and the TAG 4.

Optionally, if the adjacent subframe is a next subframe of the third uplink subframe, the M symbols are the first M OFDM symbols in the next subframe; and/or if the adjacent subframe is a previous subframe of the third uplink subframe, the M symbols are the last M OFDM symbols in the previous subframe.

Optionally, the second uplink signal is an uplink reference signal or a preamble.

Optionally, that a network device determines that a terminal device cancels sending of K consecutive OFDM symbols in a second uplink subframe includes:

if determining that a power sum of the terminal device for sending the second uplink subframe on all the carriers in the second carrier set is greater than a maximum transmit power of the terminal device, determining, by the network device, that the terminal device cancels sending of the K OFDM symbols.

Optionally, that a network device determines that a terminal device cancels sending of K consecutive OFDM symbols in a second uplink subframe includes:

when a quantity of carriers included in the second carrier set is greater than a quantity of uplink carriers that can be simultaneously sent by the terminal device, determining, by the network device, that the terminal device cancels sending of the K OFDM symbols.

Optionally, the first uplink signal includes an uplink reference signal and/or a preamble.

Optionally, the uplink reference signal is a sounding reference signal SRS.

In the method, for a communications standard of a wireless communications system in which the terminal device and the network device are located, refer to the wireless communications system shown in FIG. 5. For various types of the network device, refer to the type of the network device 502. For various types of the terminal device, refer to the type of the terminal device 501.

For another optional implementation of the method, refer to processing of the network device 502 in optional solution 2 of the wireless communications system shown in FIG. 5.

In the method, for two cases existing when the network device performs processing, refer to the two cases in optional solution 2 of the wireless communications system shown in FIG. 5. In case 1, for a condition that is used by the network device to determine that the terminal device cancels sending of some OFDM symbols on a carrier, refer to condition 1 and condition 2 in case 1 in optional solution 2 of the wireless communications system shown in FIG. 5. In case 2, which is similar to case 2 in optional solution 2 of the wireless communications system shown in FIG. 5, the network device may determine that the terminal device cancels sending of some OFDM symbols on a normal carrier during a switchover between the special carrier and the normal carrier. For a rule in which the network device determines a carrier on which the terminal device cancels sending, refer to the rule in optional solution 2 of the wireless communications system shown in FIG. 5.

In the embodiments of the present disclosure, an uplink subframe on some carriers is rejected or some ODFM symbols of an uplink subframe on some carriers are rejected, to resolve a problem that information such as downlink channel characteristics of some carriers cannot be obtained when no uplink reference signal (such as an SRS) is sent on these carriers. In addition, a conflict is avoided.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specific function in one or more processes in the flowcharts and/or in one or more blocks in the block diagrams.

These computer program instructions may be stored in a computer readable memory that can instruct a computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A terminal device, comprising:
a non-transitory memory storage comprising instructions;
one or more hardware processors in communication with the memory storage, wherein the one or more hardware processors execute the instructions to:
determine that the terminal device cancels sending of at least one of a physical uplink shared channel (PUSCH) or a physical uplink control channel (PUCCH) in K consecutive orthogonal frequency division multiplexing (OFDM) symbols in an uplink subframe, wherein the K symbols are located on one or more normal carriers in a carrier set, the carrier set comprises carriers in carrier aggregation that are used by the terminal device to send in the uplink subframe, each of the one or more normal carriers is a carrier that is used by the terminal device to send at least one of: the PUSCH or the PUCCH, K is a positive integer, and K is not greater than a quantity of OFDM symbols comprised in the uplink subframe; and
a transmitter configured to send a sounding reference signal (SRS) in the K symbols on one or more special carriers in the carrier set, wherein each of the one or more special carriers is a carrier without a transmission of the PUSCH and the PUCCH.

2. The terminal device according to claim 1, wherein a length of the K symbols is not less than a sum of a first duration and a second duration, the first duration is a duration in which the SRS is sent, and the second duration is a duration in which the terminal device is switched between carriers.

3. The terminal device according to claim 2, wherein the one or more normal carriers in the carrier set belong to a first timing advance group (TAG 1), the one or more special carriers in the carrier set belong to a second timing advance group (TAG 2), the length of the K symbols is not less than a sum of the first duration, the second duration, and a third duration, and the third duration is a length that is agreed on in advance according to a timing advance (TA) difference between the TAG 1 and the TAG 2.

4. The terminal device according to claim 1, wherein the K symbols are the last K OFDM symbols in the uplink subframe.

5. The terminal device according to claim 1, wherein
the transmitter is further configured to send an another SRS in an another uplink subframe on one or more special carriers in an another carrier set, wherein the another carrier set comprises carriers in carrier aggregation that are used by the terminal device to send the another uplink subframe; and
the one or more hardware processors execute the instructions to determine that the terminal device cancels sending of at least one of the PUSCH or the PUCCH in M consecutive OFDM symbols of an adjacent uplink subframe of the another uplink subframe, wherein
the M consecutive OFDM symbols are located on one or more normal carriers in the another carrier set, M is a positive integer, and M is not greater than a quantity of OFDM symbols comprised in the adjacent uplink subframe.

6. The terminal device according to claim 5, wherein a length of the M OFDM symbols is not less than a fourth duration, and the fourth duration is a duration in which the terminal device is switched between carriers.

7. A network device, comprising:
a non-transitory memory storage comprising instructions;
one or more hardware processors in communication with the memory storage, wherein the one or more hardware processors execute the instructions to:
determine that a terminal device cancels sending of at least one of a physical uplink shared channel (PUSCH) or a physical uplink control channel (PUCCH) in K consecutive orthogonal frequency division multiplexing (OFDM) symbols in an uplink subframe; and
determine that the terminal device sends a sounding reference signal (SRS) in the K symbols on one or more special carriers in a carrier set, wherein, the K symbols are located on one or more normal carriers in the carrier set, the carrier set comprises carriers in carrier aggregation that are used by the terminal device to send in the uplink subframe, each of the one or more normal carriers is a carrier that is used by the terminal device to send at least one of: the PUSCH or the PUCCH, K is a positive integer, and K is not greater than a quantity of OFDM symbols comprised in the uplink subframe; and
a receiver configured to:
cancel receiving of the PUSCH or the PUCCH in the K symbols; and
receive the uplink signal in the K symbols on the one or more special carriers in the carrier set, wherein each of the one or more special carriers is a carrier without a transmission of the PUSCH and the PUCCH.

8. The network device according to claim 7, wherein a length of the K symbols is not less than a sum of a first duration and a second duration, the first duration is a duration in which the SRS is sent, and the second duration is a duration in which the terminal device is switched between carriers.

9. The network device according to claim 8, wherein the one or more normal carriers in the carrier set belong to a first timing advance group (TAG 1), the one or more special carriers in the carrier set belong to a second timing advance group (TAG 2),
the length of the K symbols is not less than a sum of the first duration, the second duration, and a third duration, and the third duration is a length that is agreed on in advance according to a timing advance (TA) difference between the TAG 1 and the TAG 2.

10. The network device according to claim 7, wherein the K symbols are the last K OFDM symbols in the uplink subframe.

11. An uplink sending method, comprising:
determining, by a terminal device, to cancel sending of at least one of a physical uplink shared channel (PUSCH) or a physical uplink control channel (PUCCH) in K consecutive orthogonal frequency division multiplexing (OFDM) symbols in an uplink subframe, wherein the K symbols are located on one or more normal carriers in a carrier set, the carrier set comprises carriers in carrier aggregation that are used by the terminal device to send in the uplink subframe, each of the one or more normal carriers is a carrier that is used by the terminal device to send at least one of: the PUSCH or the PUCCH, K is a positive integer, and K is not greater than a quantity of OFDM symbols comprised in the uplink subframe; and sending, by the terminal device, a sounding reference signal (SRS) in the K symbols on one or more special carriers in the carrier set, wherein each of the one or more special carriers is a carrier without a transmission of the PUSCH and the PUCCH.

12. The method according to claim 11, wherein a length of the K symbols is not less than a sum of a first duration and a second duration, the first duration is a duration in which the SRS is sent, and the second duration is a duration in which the terminal device is switched between carriers.

13. The method according to claim 12, wherein the one or more normal carriers in the carrier set belong to a first timing advance group (TAG 1), the one or more special carriers in the carrier set belong to a second timing advance group (TAG 2), the length of the K symbols is not less than a sum of the first duration, the second duration, and a third duration, and the third duration is a length that is agreed on in advance according to a timing advance (TA) difference between the TAG 1 and the TAG 2.

14. The method according to claim 11, wherein the K symbols are the last K OFDM symbols in the uplink subframe.

15. The method according to claim 11, further comprising:
sending, by the terminal device, an another SRS in an another uplink subframe on one or more special carriers in an another carrier set, wherein the another carrier set comprises carriers in carrier aggregation that are used by the terminal device to send in the another uplink subframe; and
determining, by the terminal device, to cancel sending of at least one of the PUSCH or PUCCH in M consecutive OFDM symbols of an adjacent uplink subframe of the another uplink subframe, wherein
the M consecutive OFDM symbols are located on one or more normal carriers in the another carrier set, M is a positive integer, and M is not greater than a quantity of OFDM symbols comprised in the adjacent uplink subframe.

16. An uplink receiving method, comprising:
determining, by a network device, that a terminal device cancels sending of at least one of a physical uplink shared channel (PUSCH) or a physical uplink control channel (PUCCH) in K consecutive orthogonal frequency division multiplexing (OFDM) symbols in an uplink subframe;
determining that the terminal device sends a sounding reference signaling (SRS) in the K symbols on one or more special carriers in a carrier set, wherein the K symbols are located on one or more normal carriers in the carrier set, the carrier set comprises carriers in carrier aggregation that are used by the terminal device to send in the uplink subframe, each of the one or more normal carriers is a carrier that is used by the terminal device to send at least one of: the PUSCH or the PUCCH, K is a positive integer, and K is not greater than a quantity of OFDM symbols comprised in the uplink subframe;
canceling, by the network device, receiving of the PUSCH and/or PUCCH in the K symbols; and
receiving the SRS in the K symbols on the one or more special carriers in the carrier set, wherein each the one or more special carrier is a carrier without a transmission of the PUSCH and the PUCCH.

17. The method according to claim 16, wherein a length of the K symbols is not less than a sum of a first duration and a second duration, the first duration is a duration in which the SRS is sent, and the second duration is a duration in which the terminal device is switched between carriers.

18. The method according to claim 17, wherein the one or more normal carriers in the carrier set belong to a first timing advance group (TAG 1), the one or more special carriers in the carrier set belong to a second timing advance group (TAG 2), the length of the K symbols is not less than a sum of the first duration, the second duration, and a third duration, and the third duration is a length that is agreed on in advance according to a timing advance (TA) difference between the TAG 1 and the TAG 2.

19. The method according to claim 16, wherein the K symbols are the last K OFDM symbols in the uplink subframe.

* * * * *